(12) United States Patent
Sakhnini et al.

(10) Patent No.: US 11,825,321 B2
(45) Date of Patent: Nov. 21, 2023

(54) BEAM FAILURE DETECTION USING MIXED DOWNLINK REFERENCE SIGNAL

(71) Applicant: QUALCOMM Incorporated, San Diego, CA (US)

(72) Inventors: Iyab Issam Sakhnini, San Diego, CA (US); Tao Luo, San Diego, CA (US); Olufunmilola Omolade Awoniyi-Oteri, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/458,060

(22) Filed: Aug. 26, 2021

(65) Prior Publication Data

US 2022/0095137 A1   Mar. 24, 2022

Related U.S. Application Data

(60) Provisional application No. 63/082,295, filed on Sep. 23, 2020.

(51) Int. Cl.
*H04W 24/08* (2009.01)
*H04B 17/318* (2015.01)
*H04L 5/00* (2006.01)

(52) U.S. Cl.
CPC .......... *H04W 24/08* (2013.01); *H04B 17/318* (2015.01); *H04L 5/0048* (2013.01)

(58) Field of Classification Search
CPC ... H04W 76/19; H04L 41/0661; H04B 7/0695
See application file for complete search history.

(56) References Cited

U.S. PATENT DOCUMENTS

| 2014/0092829 | A1* | 4/2014 | Han | H04L 5/0035 370/329 |
| 2014/0119266 | A1* | 5/2014 | Ng | H04L 27/2602 370/312 |
| 2015/0029966 | A1* | 1/2015 | Park | H04L 5/005 370/329 |
| 2018/0091212 | A1* | 3/2018 | Lee | H04B 7/0695 |
| 2019/0089579 | A1* | 3/2019 | Sang | H04W 36/00837 |
| 2019/0174385 | A1* | 6/2019 | Sang | H04W 36/0072 |
| 2019/0200248 | A1* | 6/2019 | Basu Mallick | H04B 7/088 |
| 2019/0274169 | A1* | 9/2019 | Tsai | H04W 56/0045 |
| 2019/0320333 | A1* | 10/2019 | Koskela | H04B 7/0617 |

(Continued)

FOREIGN PATENT DOCUMENTS

WO  WO-2020012594 A1 *  1/2020  ........... H04B 7/0695

*Primary Examiner* — Yee F Lam
(74) *Attorney, Agent, or Firm* — Procopio, Cory, Hargreaves & Savitch LLP

(57) ABSTRACT

Aspects presented herein may improve the performance and/or efficiency of a BFD procedure for a UE, where the UE may use DMRS to perform the BFD to reduce the occasion(s) of configuring multiple or frequent CSI-RS resources sets for the UE. In one aspect, an apparatus measures RSRP of one or more reference signals in a reference signal set for a BFD, the one or more reference signals include at least one DMRS. Then the apparatus compares the measurement for the at least one DMRS to a threshold. Then the apparatus initiates or restarts a BFD timer or a BFR procedure based at least in part on the measurement.

28 Claims, 12 Drawing Sheets

(56) References Cited

U.S. PATENT DOCUMENTS

| | | | |
|---|---|---|---|
| 2020/0052943 A1* | 2/2020 | Jassal | H04L 5/0012 |
| 2020/0221428 A1* | 7/2020 | Moon | H04L 1/1854 |
| 2020/0344019 A1* | 10/2020 | Da Silva | H04L 1/203 |
| 2020/0351705 A1* | 11/2020 | Chae | H04L 5/0051 |
| 2020/0389884 A1* | 12/2020 | Hakola | H04W 36/0085 |
| 2021/0006456 A1* | 1/2021 | Kim | H04L 41/0668 |
| 2021/0234752 A1* | 7/2021 | Matsumura | H04B 7/0695 |
| 2022/0110181 A1* | 4/2022 | Miao | H04L 1/1822 |
| 2022/0149922 A1* | 5/2022 | Wang | H04W 76/19 |
| 2022/0158715 A1* | 5/2022 | Bishwarup | H04W 76/19 |

\* cited by examiner

BEAM FAILURE DETECTION USING MIXED DOWNLINK REFERENCE SIGNAL

CROSS REFERENCE TO RELATED APPLICATION(S)

This application claims the benefit of and priority to U.S. Provisional Application Ser. No. 63/082,295, entitled "BEAM FAILURE DETECTION USING MIXED DOWNLINK REFERENCE SIGNAL" and filed on Sep. 23, 2020, which is expressly incorporated by reference herein in its entirety.

TECHNICAL FIELD

The present disclosure relates generally to communication systems, and more particularly, to wireless communication involving beam failure detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a UE. The apparatus measures reference signal received power (RSRP) of one or more reference signals in a reference signal set (e.g., $\bar{q}_0$ set) for a beam failure detection (BFD), the one or more reference signals include at least one demodulation reference signal (DMRS). The apparatus compares the measurement for the at least one DMRS to a threshold. The apparatus initiates or restarts a BFD timer or a beam failure recovery (BFR) procedure based at least in part on the measurement.

In an aspect of the disclosure, a method, a computer-readable medium, and an apparatus are provided for wireless communication at a base station. The apparatus configures a UE with one or more reference signals in a reference signal set for a BFD, the one or more reference signals include at least one DMRS. The apparatus transmits the reference signals in the reference signal set for the BFD.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
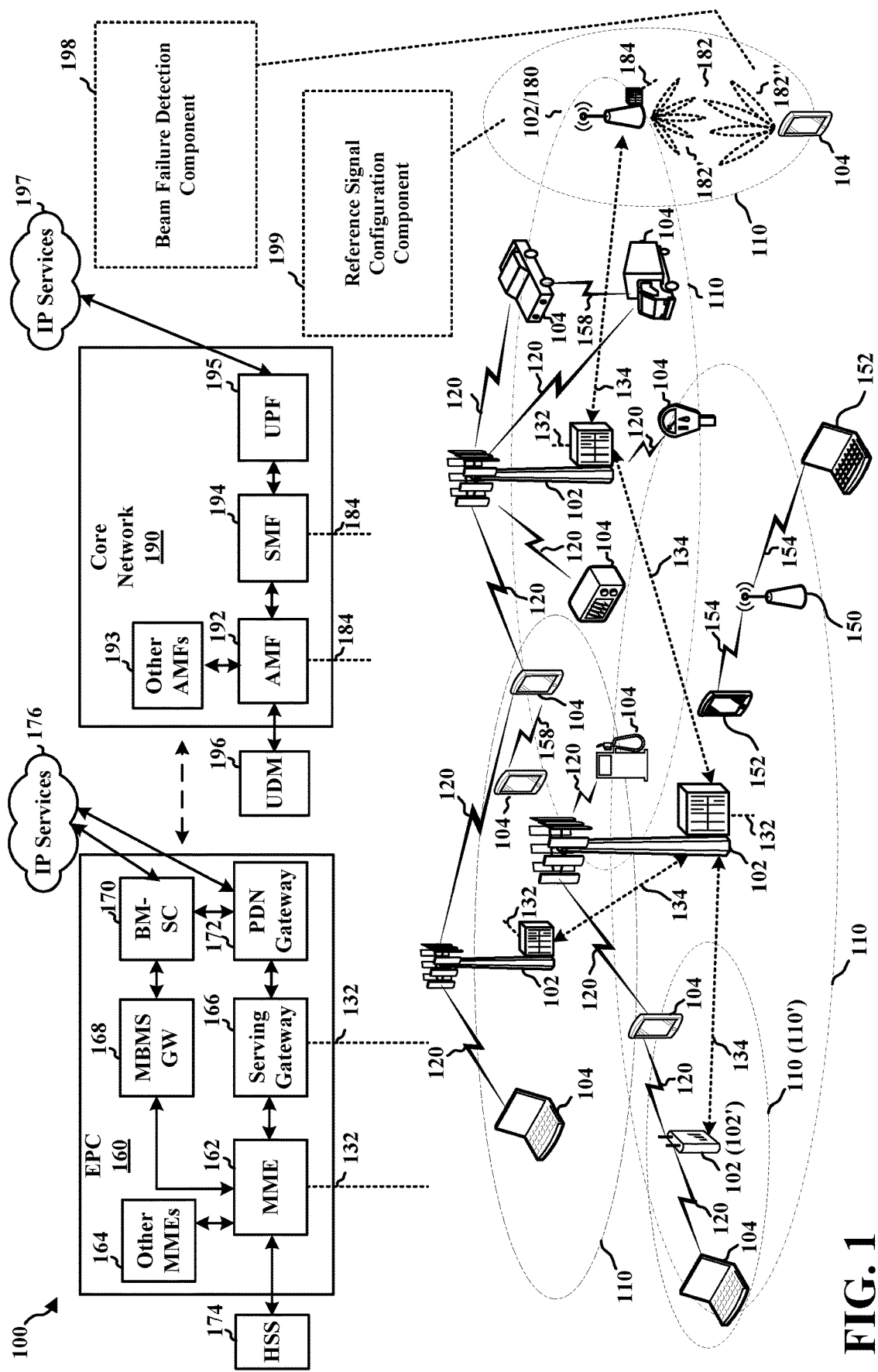
FIG. 1 is a diagram illustrating an example of a wireless communications system and an access network.

Downlink beam refinement may be performed based on UE measurements of a channel state information reference signal (CSI-RS) or synchronization signal block (SSB). Aspects presented herein may improve the performance and/or efficiency of a BFD procedure for a UE, through the use DMRS to perform the BFD. BFD based on DMRS may enable a reduction in the frequency of CSI-RS resources and a more efficient use of wireless resources. As well, the use of DMRS may enable BFD across multiple transmission configuration indicator (TCI) states. In some aspects, BFD may be performed based on combination of reference signals, e.g., including DMRS in combination with CSI-RS and/or SSB.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregated, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a beam failure detection component 198 configured to perform the BFD procedure. In one aspect, the beam failure detection component 198 may be configured to measure RSRP of one or more reference signals in a reference signal set ($\bar{q}_0$ set) for a BFD, the one or more reference signals may include at least one DMRS. In some examples, the one or more reference signals may further include a CSI-RS and/or an SSB. The beam failure detection component 198 may also be configured to compare the measurement for the at least one DMRS to a threshold. The beam failure detection component 198 may also be configured to initiate or restart a BFD timer or a BFR procedure based at least in part on the measurement (e.g., based on the comparison result).

In certain aspects, the base station 102/180 may include a reference signal configuration component 199 configured to configure a UE (e.g., UE 104) with one or more reference signals in a reference signal set ($\bar{q}_0$ set) for a BFD, the one or more reference signals include at least one DMRS. In some examples, the one or more reference signals may further include a CSI-RS and/or an SSB. The reference signal configuration component 199 may also be configured to transmit the reference signals in the reference signal set for the BFD.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
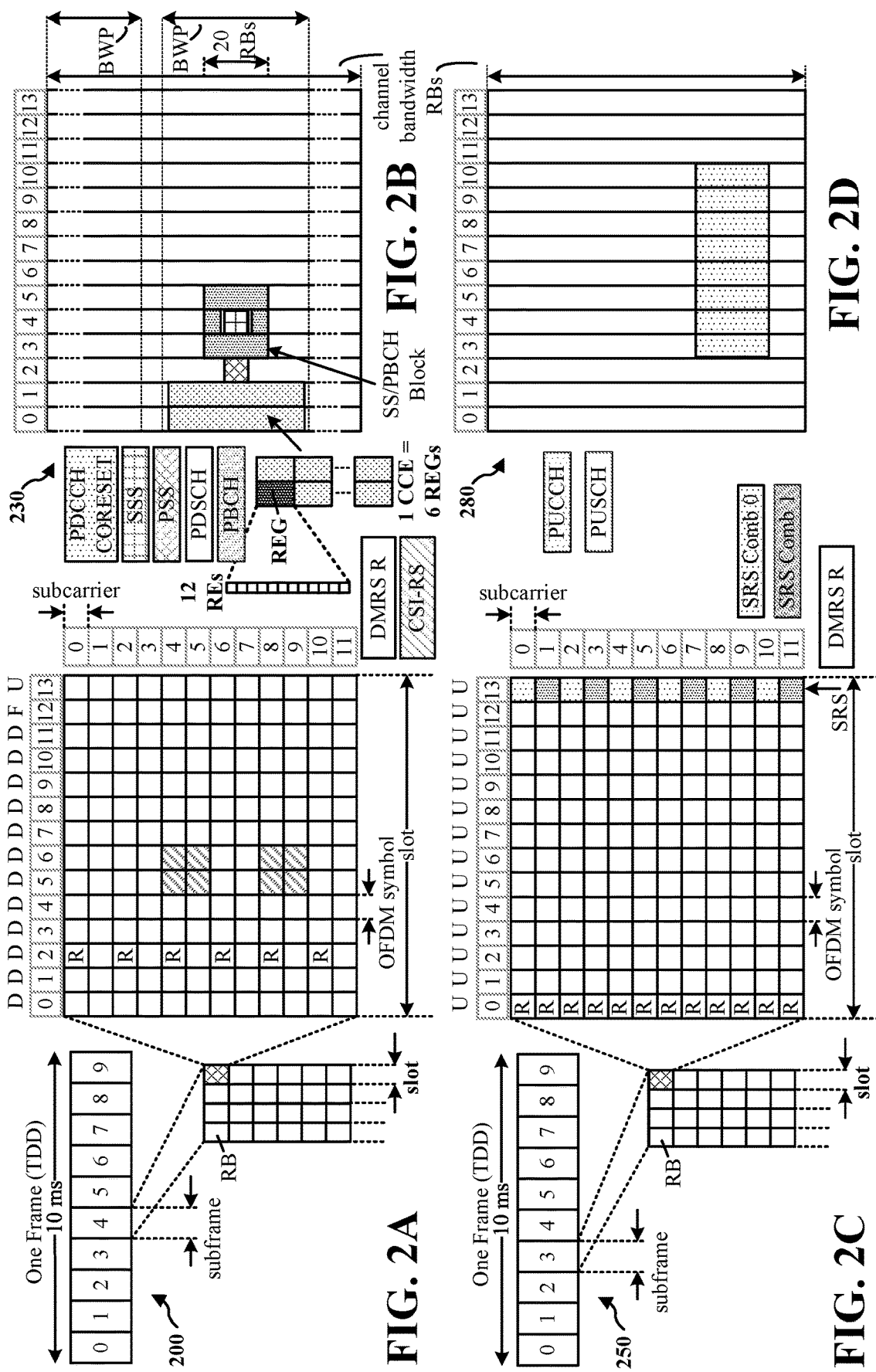
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms)

may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
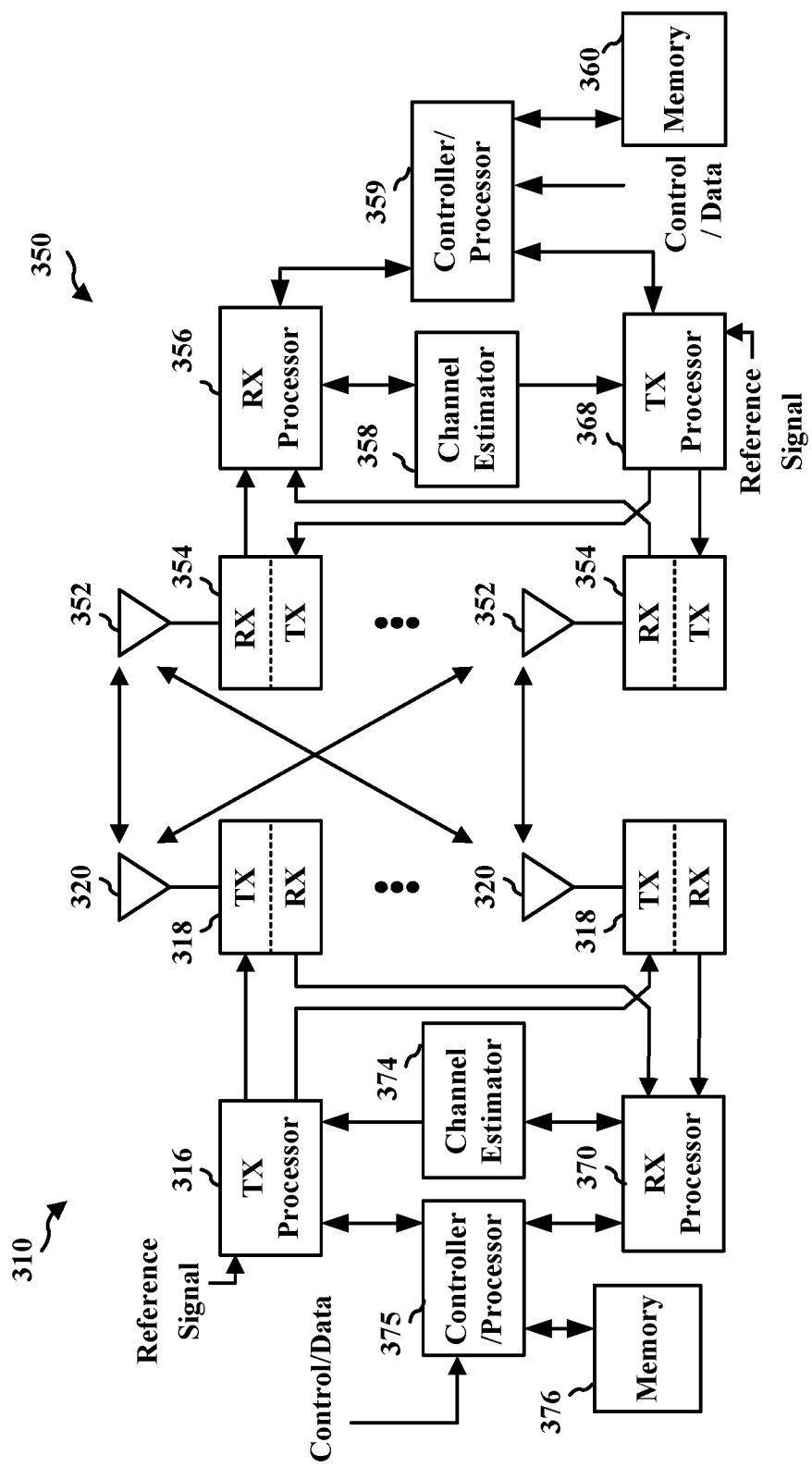
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam failure detection component 198 of FIG. 1.

At least one of the TX processor 316, the RX processor 370, and the controller/processor 375 may be configured to perform aspects in connection with the reference signal configuration component 199 of FIG. 1.

Wireless communication may support higher capability devices as well as reduced capability devices. Among others, examples of higher capability devices may include premium smartphones, V2X devices, URLLC devices, eMBB devices, etc. Among other examples, reduced capability devices may include wearables, industrial wireless sensor networks (IWSN), surveillance cameras, low-end smartphones, etc. For example, NR communication systems may support both the higher capability devices and the reduced capability devices. A reduced capability device (e.g., reduced capability UE) may be referred to as an NR light device, a reduced capability NR device, a low-tier device, a lower tier device, etc. Reduced capability UEs may communicate based on various types of wireless communication (e.g., device type, machine type, dynamic operations type, reduced capability on/off indications, etc.). For example, smart wearables may transmit or receive communication based on low power wide area (LPWA)/mMTC, relaxed IoT devices may transmit or receive communication based on URLLC, sensors/cameras may transmit or receive communication based on eMBB, etc. For purpose of the present disclosure, the term "reduced capability" may be used to describe a UE with the reduced capability (e.g., reduced capability UE). In some examples, the term "reduced capability" may be an indication transmitted from a UE to indicate that the UE may be operating as a reduced capability UE. For example, a UE may report a reduced capability to a base station, where the UE is indicating to the base station that it is a reduced capability UE, such as a reduced capability NR device, etc.

It may be helpful for communication to be scalable and deployable in a more efficient and cost-effective way. In some aspects, it may be possible to relax or reduce peak throughput, latency, and/or reliability requirements for the reduced capability devices. In some examples, reductions in power consumption, complexity, production cost, and/or reductions in system overhead may be prioritized. Reduced capability devices may include fewer, limited, and/or targeted communication abilities relative to other communication device types. By providing reduced capability devices with targeted communication abilities, such devices are provisioned to operate in a range of operational settings.

In some examples, a reduced capability UE may have an uplink transmission power of at least 10 dB less than that a higher capability UE. As another example, a reduced capability UE may have reduced transmission bandwidth or reception bandwidth than other UEs. For instance, a reduced capability UE may have an operating bandwidth between 5 MHz and 20 MHz for both transmission and reception, in contrast to other UEs which may have a bandwidth of up to 100 MHz bandwidth. As a further example, a reduced capability UE may have a reduced number of reception antennas in comparison to other UEs. For instance, a reduced capability UE may have only a single receive antenna and may experience a lower equivalent receive signal to noise ratio (SNR) in comparison to higher capability UEs that may have multiple antennas. Thus, a reduced capability UE may receive PDCCH and/or PDSCH repetitions to compensate for the coverage loss in downlink. A reduced capability UEs may also have reduced computational complexity than other UEs. In addition, a reduced capability UE may be more delay tolerant, such that it may have a more enhanced power saving and battery life configuration.

As indicated above, a base station and a UE may communicate via one or more directional beams, where the base station may engage in a beam sweeping operation to establish an active transmitting beam with the UE. During the beam sweeping operation, the base station may perform a sector sweep with wide-formed and/or lower gain beams to establish a connection, which may be referred to as "coarse beams." Then, the base station may perform beam refinement using narrower and/or higher gain beams, which may be referred to as "fine beams," and the UE may identify a transmitting beam on which subsequent communications may be performed. The base station may perform a continuous beam tracking process by adjusting the refined beam to maintain and/or to improve the connection.

Similarly, a UE may perform beam refinement on a receive beam. For example, the UE may request repetitions of a reference signal (e.g., a channel state information reference signal (CSI-RS) and/or a synchronization signal block (SSB), etc.). Then, the UE may measure one or more receiving beams using the repetitions of the reference signal to determine a best receiving beam (e.g., compared to other receiving beams), such as based on reference signal received power (RSRP) measurements of the receiving beams. The UE may perform a continuous beam tracking process by adjusting the refined beam to maintain and/or improve the connection. In some instances, the UE may also perform beam management and/or refinement using a demodulation reference signal (DMRS), alone or in association with the CSI-RS and/or the SSB. Using DMRS for beam management and/or refinement may enable the UE, such as a reduced capability UE, to have more flexibility in resource allocation and usage. For example, the UE may reduce resources used/configured for the CSI-RS when the DMRS is used for beam management, beam refinement, and/or BFD.

Semi-persistent scheduling (SPS) and/or a configured grant (CG) may provide a configuration of periodic resources for data transmission with the UE (e.g., over downlink or uplink). The UE may use the periodic resources to transmit or receive data without additional dynamic scheduling. In some scenarios, for certain applications and/or UEs (e.g., reduced capabilities UEs) that may prefer using pre-configured resources, SPS resources may be configured for transmissions with repetitions based on multiple transmission configuration indicator (TCI) states.

Aspects presented herein may improve the performance and/or efficiency of a beam failure detection (BFD) procedure for a UE, where the UE may use DMRS to perform the BFD procedure to reduce the occasion(s) of configuring multiple or frequent CSI-RS resources sets for the UE as DMRS may already be available or configured for the UE. For example, using the CSI-RS/SSB in association or mixed with DMRS may reduce the number of CSI-RS resources configured for the UE and/or increase possible/potential beams that may be used for the BFD procedure without configuring as many CSI-RS resources for the UE (e.g., compared to using CSI-RS/SSB alone). This may also enable a UE, such as a reduced capability UE, to perform BFD if the UE and/or the traffic support a smaller or lower bandwidth.

In some examples, when a connection between a UE and a base station becomes weak, unstable and/or disconnected, the UE and the base station may perform link recovery to recover or improve the connection. The link recovery procedure may be associated with a BFD procedure and a beam failure recovery (BFR) procedure, which may be triggered after the connection has been established between the UE and the base station. Reference signals such as CSI-RS and the SSB may be used for performing the link recovery procedure.

Figure 4:
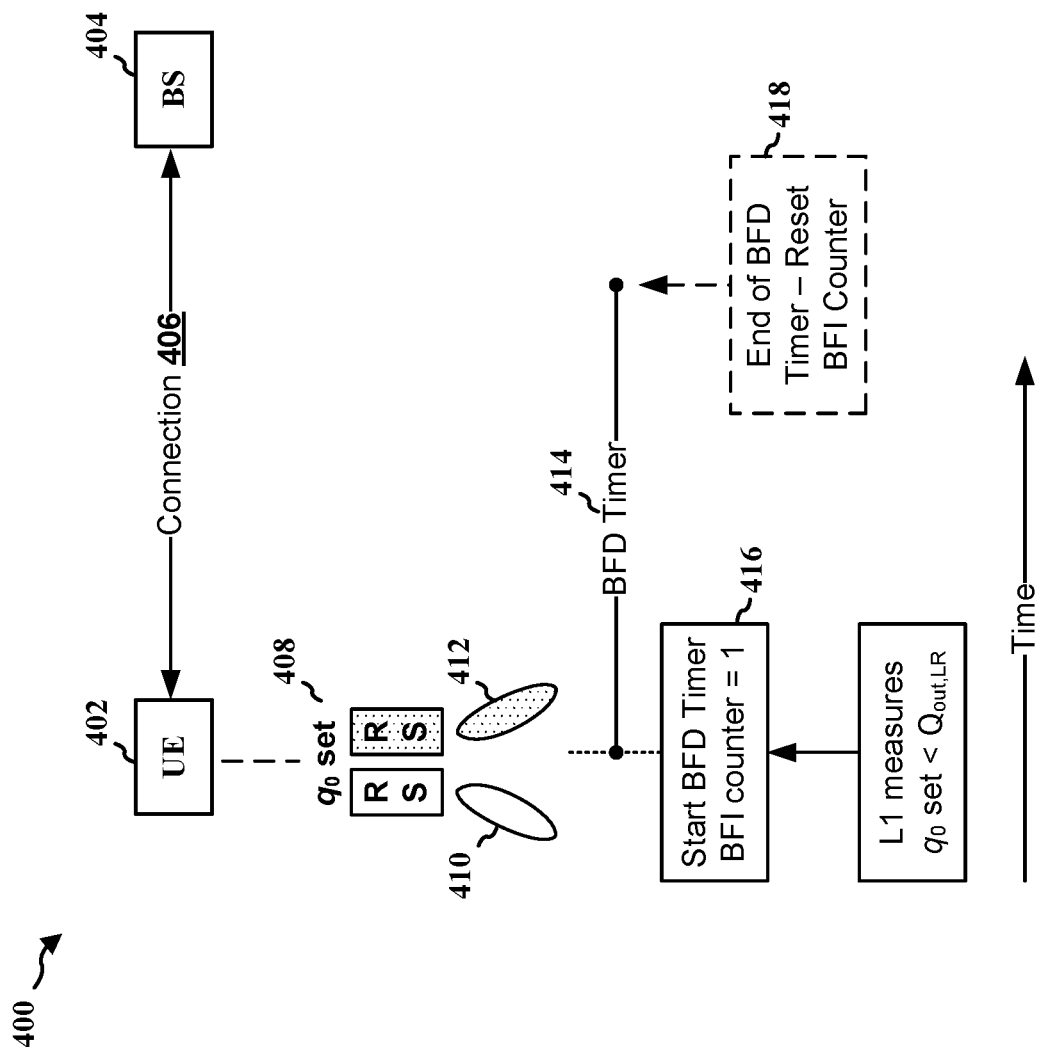
FIG. 4 is a diagram illustrating an example of a BFD procedure according to aspects of the present disclosure.
Figure 5:
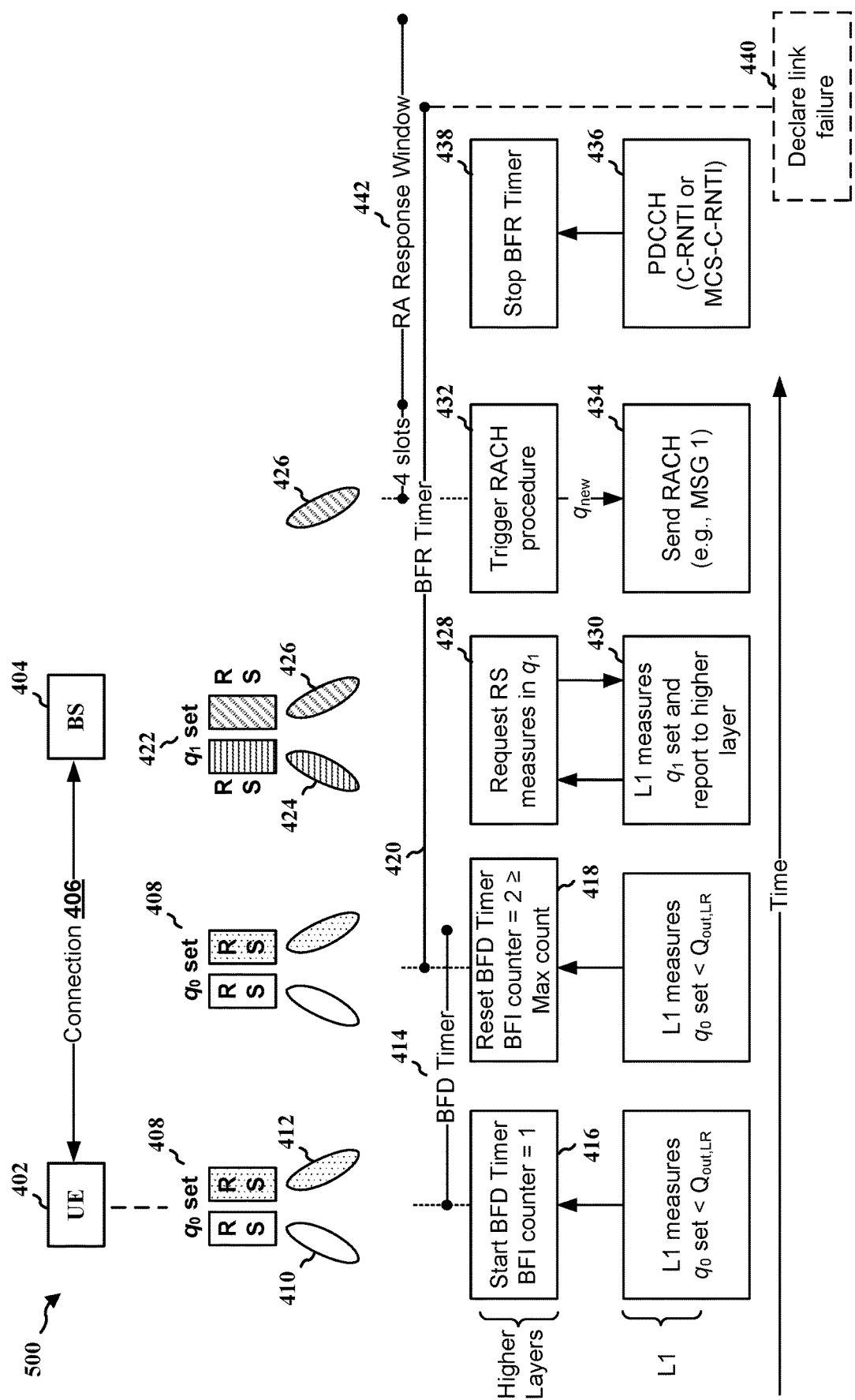
FIG. 5 is a diagram illustrating an example of a BFD procedure according to aspects of the present disclosure.

FIGS. 4 and 5 are diagrams 400 and 500 illustrating example procedures for BFD and BFR. The procedures may apply to a connection between a UE and a primary serving cell (PCell) or a primary secondary cell group (SCG) cell (PSCell) under a non-discontinuous reception (non-DRX) mode. For each bandwidth part (BWP) of a serving cell (e.g., a serving base station), a UE may be configured with a $\bar{q}_0$ set (e.g., a set of reference signals) that may be associated with one or more beams for failure detection and a $\bar{q}_1$ set (e.g., another set of reference signals) that may be associated with candidate beams for recovery.

For example, referring to the diagram 400 of FIG. 4, a base station 404 may configure periodic CSI-RS resources and/or SSBs for a UE 402 (e.g., through an RRC configuration). The UE 402 may use the configured CSI-RS resources and/or SSBs to periodically check the connection 406 between the base station 404 and the UE 402. These periodic resources may be appointed by a reference signal $\bar{q}_0$ set 408 that may include CSI-RS resource configuration indexes and/or SSB indexes. For example, the CSI-RS resource configuration indexes and/or SSB indexes may correspond to or associate with beams 410 and 412. During the BFD process, the UE 402 may assess or determine the radio link quality of the connection 406 by measuring the RSRP for each beam within the $\bar{q}_0$ set 408 continuously and compare the measurement to a threshold (e.g., $Q_{out,LR}$). The threshold may indicate a level or a value in which a downlink transmission may not be reliably received by the UE 402.

When the measurements for all beams (e.g., 410, 412) within the $\bar{q}_0$ set 408 for the connection 406 fall below the threshold (e.g., $Q_{out,LR}$) at a measuring instance (e.g., measurements for the beam 410 and the beam 412 are both below the threshold $Q_{out,LR}$), the UE 402 may initiate a BFD timer 414 (e.g., beamFailureDetectionTimer—timer for beam failure detection). The UE 402 may also initiate a beam failure indication (BFI) counter 416 (e.g., starting with BFI=1) when there is no existing BFI counter 416 (e.g., BFI=0), or the UE 402 may increment the BFI counter by 1 when there is an existing BFI counter (e.g., from BFI=1 to BFI=2). The BFI counter 416 may be used by the UE 402 to compare against a threshold (e.g., beamFailureInstanceMaxCount) and to determine beam failure events after which the UE 402 triggers a beam failure recovery procedure.

During the BFD timer 414 is running, the UE 402 may continue to measure the RSRP of beams within the $\bar{q}_0$ set 408 and compare the measurements to the threshold (e.g., $Q_{out,LR}$). If there is no additional measuring instance where the measurements for all beams (e.g., 410, 412) within the $\bar{q}_0$ set 408 fall below the threshold (i.e., at least one of the beams' measurement is above the threshold) before the BFD timer 414 expires, the UE 402 may end the BFD timer 414 and reset the BFI counter as shown at 418. After the BFD timer 414 expires, if the UE 402 encounters another measuring instance where all beams within the $\bar{q}_0$ set fall below the threshold $Q_{out,LR}$, the UE 402 may start the BFD timer 414 and the BFI counter 416 (e.g., starting from BFI=1) again.

On the other hand, as shown by the diagram 500 of FIG. 5, while the BFD timer 414 is running, if there is another measuring instance where measurements for all beams (e.g., 410, 412) within the $\bar{q}_0$ set 408 fall below the threshold (e.g., $Q_{out,LR}$), the UE 402 may increase the BFI counter by 1 and restart the BFD timer 414. For example, during the BFD timer 414 is running, if there is another instance where measurements for all beams within the $\bar{q}_0$ set 408 are below the threshold, the BFI counter may be increased from BFI=1 to BFI=2, such as shown at 418, and then the UE 402 may restart the BFD timer 414 and continue to measure the RSRP of beams within the $\bar{q}_0$ set 408. During the restarted BFD timer 414, if there is another measuring instance where measurements for all beams within the $\bar{q}_0$ set 408 are below the threshold, the UE 402 may again increase the BFI counter by 1 (e.g., from BFI=2 to BFI=3) and restart the BFD timer 414, and this process may be repeated until the BFI counter reaches a threshold (e.g., beamFailureInstanceMaxCount). Similarly, if there is no measuring instance where the measurements for all beams within the $\bar{q}_{10}$ set 408 fall below the threshold $Q_{out,LR}$ before the restarted BFD timer 414 expires (and before the BFI counter reaches the threshold), the UE 402 may end the restarted BFD timer 414 and reset the BFI counter as described in connection with FIG. 4 (e.g., the counter starts from 1 again). In one example, if measurements of all beams in the $\bar{q}_0$ set are less than $Q_{out,LR}$, the Layer 1 (L1) of a UE may report to higher layers with a period (e.g., max{2 ms, smallest CSI-RS/SSB periodicity}), and every report to higher layer BFI_COUNTER may be incremented and beamFailureDetectionTimer is started/restarted. If beamFailureDetectionTimer expires, then the UE may reset BFI_COUNTER.

Referring back to FIG. 5, as shown at 418, if the BFI counter 416 reaches a threshold (e.g., beamFailureInstanceMaxCount) or a maximum count for a beam failure instance (e.g., the BFI counter is equal to or greater than the threshold or the maximum count), the UE 402 may initiate a BFR timer 420 (e.g., beamFailureRecoveryTimer) for a beam failure recovery procedure. Then, the UE 402 may initiate a random access (RA) procedure for BFR purposes. The UE 402 may also initiate a RA response window/timer 442 after a duration (e.g., after 4 slots). During the RA procedure, the UE 402 may search for backup resource set/beams provided by the base station 404 for the beam recovery. For example, the UE 402 may search for a $\bar{q}_1$ set 422 that includes one or more candidate beams 424 and 426 for the beam recovery. After the UE 402 finds the $\bar{q}_1$ set 422, the UE 402 may measure the RSRP of the beams 424, 426 based on the CSI-RS and/or the SSB associated with the beams 424, 426, such as shown at 428 and 430. The SSB and the CSI-RS may have separate RSRP thresholds that are initialized by the RRC and used for candidate selection. If the measurement for any of the beams (e.g., 424, 426) within the $\bar{q}_1$ set 422 is above a threshold $Q_{in,LR}$ (e.g., in-sync(IS) threshold), the UE 402 may trigger a random access channel (RACH) procedure (e.g., using a pre-configured resource) as shown at 432, and the UE 402 may send a RACH message (e.g., MSG 1) to the base station 404 as shown at 434. For example, if the RA for the BFR is contention free, the base station 404 may provide the UE 402 with resources for sending the RA request. The resources may be associated to SSBs or CSI-RSs contained within a candidate beam list (e.g., candidateBeamRSList or the $\bar{q}_1$ set). If at least one of beams is available and has an RSRP above the threshold (e.g., $Q_{in,LR}$), that beam (e.g., the reference signal, $\bar{q}_{new}$) may be selected and the resources associated with that beam may be used for the preamble transmission (e.g., MSG 1).

In response to the RACH message, the base station 404 may send a PDCCH message to the UE 402 acknowledging the UE 402's selection of the new beam, such as shown at 436. For example, as the UE 402 may send a contention free RA request with resources allocated by the base station 404 for the BFR, the base station 404 may also inform the UE 402 regarding the search spaces to monitor for the PDCCH transmission associating with the RA response. Based on the cell radio network temporary identifier (C-RNTI) and/or modulation coding scheme (MCS) C-RNTI (MCS-C-RNTI) within a received/monitored PDCCH, the UE 402 may verify whether the PDCCH carries the acknowledgement message for the UE 402. If the decoded PDCCH message carries the acknowledgement for the UE 402, as shown at 438, the UE 402 may consider the RA procedure for the BFR is successful or completed, and the UE 402 may stop the BFR timer 420. Then the UE 402 may restart the initial BFD process as described in connection with FIG. 4 for the new connection/beam(s).

On the other hand, if the UE 402 does not receive any PDCCH or acknowledgement from the base station 404 during the RA response window/timer 442 or the UE 402 was unable to find the $\bar{q}_1$ set or none of the measurements for beams within the $\bar{q}_1$ set is above the threshold before the BFR timer 420 expires, the UE 402 may declare a radio link failure (RLF) for the connection 406 when the BFR timer 420 expires, such as shown at 440, and the UE 402 may initiate procedures for resolving the RLF. In other words, when BFI_COUNTER≥beamFailureInstanceMaxCount, the UE 402 may initiate the RA procedure. Then the UE 402 may measure beams in the $\bar{q}_1$ set 422 and report to higher layers if any beam is higher than the threshold $Q_{in,LR}$. Then the UE 402 may send contention-free RACH on a new beam and waits for PDCCH/PDSCH on the new beam.

Figure 6:
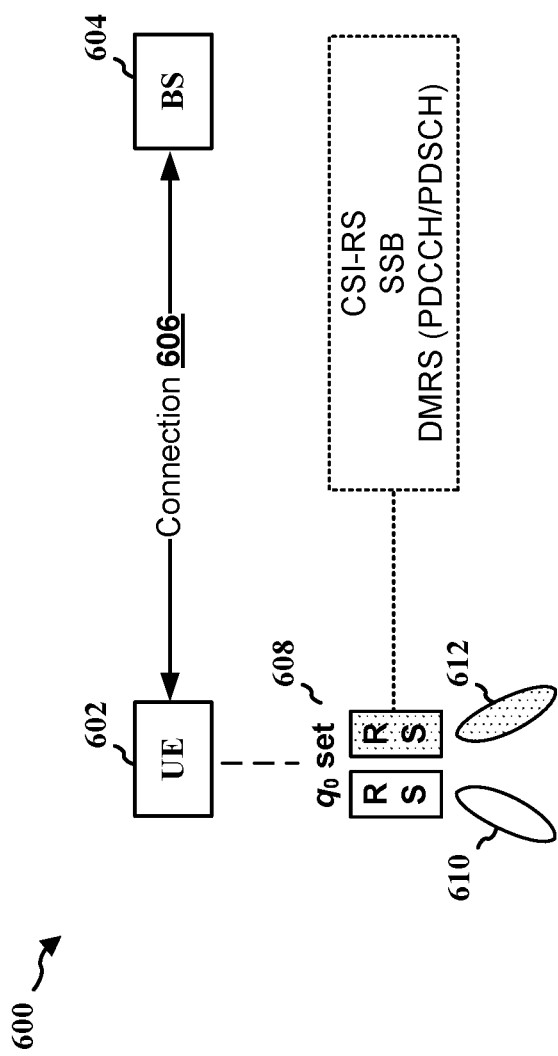
FIG. 6 is a diagram illustrating an example of a BFD procedure according to aspects of the present disclosure.

Aspects presented herein may improve the performance and/or efficiency of a BFD procedure for a UE, such as by reducing the number of CSI-RS resources configured for the UE and/or increasing possible/potential beams that may be used for the BFD without additional CSI-RS resources. In one aspect, as shown by a diagram 600 of FIG. 6, a base station 604 may configure a UE 602 with a $\bar{q}_0$ set 608 of beams (e.g., 610, 612) that has at least one beam associated with a DMRS (e.g., DMRS from PDCCH and/or PDSCH, etc.) for a BFD procedure of a connection 606. In other words, a mixed of the SSB, the CSI-RS and/or DMRS may be included in the $\bar{q}_0$ set 608 as reference signals (e.g., as beams for failure detection) in the BFD procedure. Then, the base station 604 may transmit the configured $\bar{q}_0$ set 608 to the UE 602. As DMRS may be for a specific UE (e.g., the DMRS may be UE-specific) and the UE may use DMRS to estimate the radio channel, there may already be one or more DMRSs available or configured for the UE by a base station. Thus, by enabling the UE to use DMRS to perform the BFD, it may reduce the occasion(s) of configuring multiple or frequent CSI-RS resources sets for the UE. In one example, the base station 604 may configure the one or more beams for DMRS to be quasi-co-located (QCLed) with the CSI-RS and/or one or more tracking reference signals (TRSs), such that DMRS measured by the UE 602 may be from a beam that is pointing in a particular direction (e.g., same direction as the CSI-RS, SSB and/or TRS). In other words, the base station may be configured to ensure that the beams (e.g., 610, 612) for DMRS are quasi-co-located with the corresponding CSI-RS/TRSs.

Figure 7:
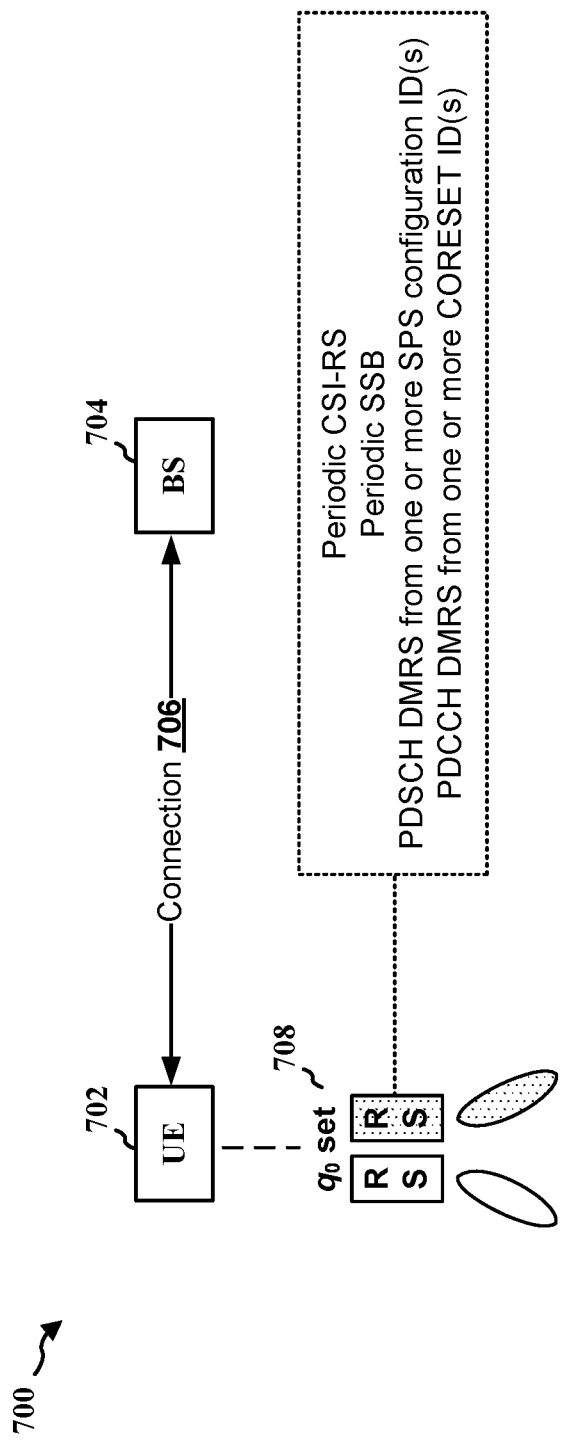
FIG. 7 is a diagram illustrating an example of a BFD procedure according to aspects of the present disclosure.

In another aspect, as shown by a diagram 700 of FIG. 7, an RS set (e.g., the $\bar{q}_0$ set 708) for the BFD procedure of a connection 706 between a UE 702 and a base station 704 may be configured to include a periodic CSI-RS, SSB, and/or PDSCH DMRS from one or more SPS configuration ID(s) or PDCCH DMRS from one or more control resource set (CORESET) ID(s) or its associated search space(s). For example, there may be multiple SPS configurations for the PDSCH DMRS, and/or there may be multiple CORESET IDs or search spaces for the PDCCH DMRS.

In another aspect, the threshold (e.g., threshold $Q_{out,LR}$) that the UE uses during a BFD procedure, such as described in connection with FIGS. 4 and 5, may be reused for DMRS when the UE (e.g., UE 402, 602, 702) is measuring the RSRP for beams/RS in a $\bar{q}_0$ set (e.g., 608, 708) that includes one or more DMRS. In other words, in measuring whether a DMRS beam within the $\bar{q}_0$ set is above the threshold, the UE may be configured to use the threshold $Q_{out,LR}$ that is used for determining whether the measurement for the CSI-RS and/or SSB is above the threshold. Alternatively, or additionally, the UE may be configured to use another threshold for DMRS. A separate threshold may be configured for DMRS as the transmitting power for DMRS may be different from the CSI-RS. The threshold for the DMRS may be indicated to the UE by the base station (e.g., base station 604, 704) or defined/configured at the UE depending on the implementation.

In another aspect, as a PDSCH may be transmitted using a higher rank (e.g., rank>1), such as rank 2 or rank 4, that includes multiple DMRS (e.g., 2, 4, 8 DMRS, etc.), a UE (e.g., UE 402, 602, 702) may have one or more options to choose or determine which DMRS(s) is/are to be measured for a BFD procedure (e.g., when DMRS is included in the $\bar{q}_0$ set). In one example, the measurement may be performed per DMRS port, where the UE may perform the measurement for all DMRS within the PDSCH. Thus, if there are four DMRS in the PDSCH, the UE may measure the RSRP for all four DMRS. Then the UE may initiate the BFD timer (e.g., as described in connection with the BFD timer 414 of FIG. 4) when all measurements (e.g., 4), a defined number of measurements (e.g., 2 or 3), and/or a defined percentage of measurements (e.g., 75%) fall below a threshold (e.g., the threshold $Q_{out,LR}$). In another example, the UE may determine whether to initiate the BFD timer or whether the DMRS beam(s) in the $\bar{q}_0$ set is above/below the threshold based on whether there is any DMRS within the multiple DMRS has a measurement above a threshold. For example, the UE may compare the DMRS with the best/highest RSRP measurement to the threshold, and determine not to initiate the BFD timer when the DMRS with best measurement is above the threshold (e.g., there may be one or more DMRS that are measured below the threshold). In another example, the UE may determine whether to initiate the BFD timer or whether the DMRS beam(s) in the $\bar{q}_0$ set is above/below the threshold by combining measurements from multiple DMRS ports and comparing the combined measurement to a threshold, or by obtaining the average value or the median value of measurements from multiple DMRS ports and compare the average value or the median value to a threshold. If the combined value, average value or the median value is above the threshold, the UE may consider the DMRS beam(s) in the $\bar{q}_0$ set is above the threshold. On the other hand, if the combined value, average value or the median value is below the threshold, the UE may consider the DMRS beam(s) in the $\bar{q}_0$ set is below the threshold and initiate the BFD timer. Which option(s) to be used by the UE may be network configured or specified.

In another aspect, the SSB, CSI-RS and/or DMRS that are included in the $\bar{q}_0$ RS set may belong to a same transmission and reception point (TRP), or they may belong to different TRPs with the same or different physical cell IDs (PCIs). For example, the SSB, CSI-RS and/or DMRS may come from one TRP, or the SSB and CSI-RS may come from one TRP (e.g., TRP A) and the DMRS may come from another TRP (e.g., TRP B), etc. TRP A and TRP B may have the same PCI or they may have different PCIs.

In another aspect, in some SPS occasions, a base station may determine not to transmit PDSCH (e.g., on scheduled periodic resources), such as when there is no data to be transmitted to the UE. Thus, the UE may not be able to assess/determine the link condition based on measuring the DMRS as the DMRS from the PDSCH may be unavailable or missing. For example, the UE may obtain a RSRP measurement that is below the threshold as the PDSCH carrying the DMRS is not transmitted from the base station. This may resemble a poor connection measurement as the measurement falls below the threshold, and may prompt the UE to trigger a BFD timer, as described in connection with FIG. 4. As such, the UE may be configured with one or more algorithms for detecting/determining whether DMRS is presented in the SPS and/or PDCCH occasions. In one example, the DMRS detection may be threshold-based. For example, an additional threshold may be configured for a UE (e.g., UE 402, 602, 702) to determine whether DMRS (e.g., or its corresponding PDSCH/PDCCH) is being transmitted in a transmitting occasion. As the measured RSRP may be much lower when there is no transmission in a channel, a different threshold (e.g., different from the threshold $Q_{out,LR}$) may be used by the UE for determining whether DMRS is available. After the UE confirms there is a DMRS in a scheduled transmission (e.g., the corresponding PDSCH/PDCCH is transmitted), the UE may continue the BFD procedure. For example, the UE may determine whether the measured RSRP also passes the threshold $Q_{out,LR}$ for the BFD, and determine whether to initiate the BFD timer/procedure or increase the BFI counter, etc. However, if the UE determines a scheduled PDCCH/PDSCH (e.g., DMRS) is not being transmitted to the UE based on the measurement, the UE may skip the BFD procedure for that transmission occasion. For example, the UE may be refrained from initiating the BFD timer, or increasing the BFI counter if a BFD timer is already running. In other words, the UE may exclude beam measurements for BFD when there is no transmission. In another example, a UE (e.g., UE 402, 602, 702) may determine whether there is a PDSCH and/or a PDCCH transmission based on the cyclic redundancy check (CRC) for the PDSCH and/or the PDCCH. For example, if the CRC for the PDSCH and/or the PDCCH passes, then the UE may assume there is a PDSCH and/or PDCCH transmitted from the base station and proceed with the BFD procedure. On the other hand, if the CRC for the PDSCH and/or the PDCCH fails, the UE may assume there is no PDSCH and/or PDCCH transmitted from the base station and the UE may skip the BFD procedure for that transmission occasion. In other words, the UE may exclude beam measurements for BFD from that transmission occasion.

Figure 8:
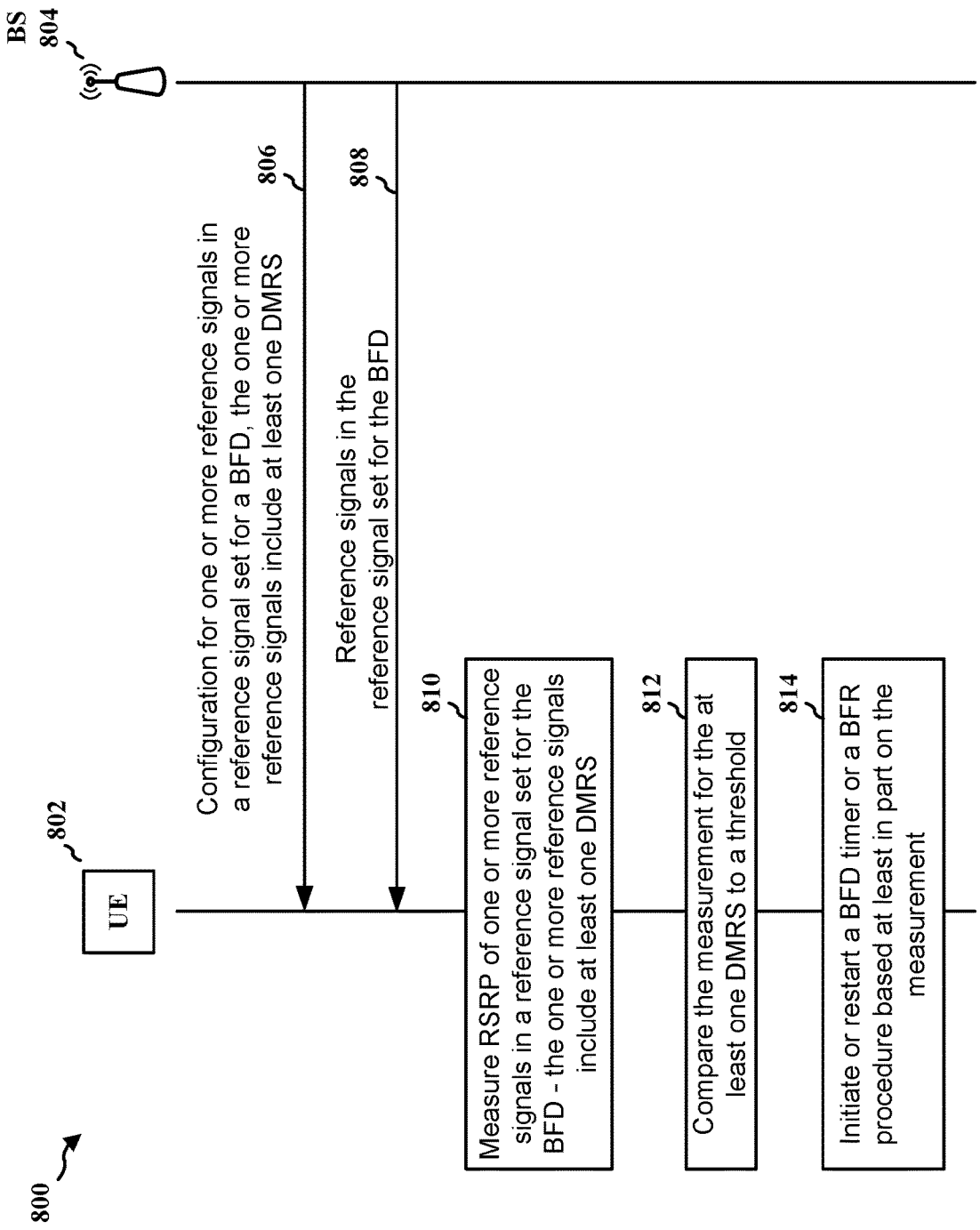
FIG. 8 is a communication flow between a UE and a base station according to aspects of the present disclosure.

FIG. 8 is a communication flow 800 between a UE (e.g., the UE 402, 602, 702) and a base station (e.g., the base station 404, 604, 704) according to aspects of the present disclosure. At 806, a base station 804 may transmit a configuration to a UE 802 to configure the UE 802 with one or more reference signals in a reference signal set (e.g., the $\bar{q}_0$ set) for a BFD, where the one or more reference signals may include at least one DMRS. The reference signal set may further include at least one of an SSB or a CSI-RS. Thus, the one or more reference signals may include DMRS only, or the one or more reference signals may include DMRS and at least one of CSI-RS or the SSB, etc. The base station 804 may also configure one or more beams associated with the at least one DMRS to be quasi-co-located with the CSI-RS or one or more tracking reference signals.

Then, at 808, the base station may transmit the reference signals in the reference signal set for the BFD to the UE 802.

In one example, when the reference signal set includes at least one DMRS and at least one of an SSB or a CSI-RS, the SSB and/or the CSI-RS may be configured to be periodic. The at least one DMRS may be transmitted in a PDSCH associated with one or more SPS configuration IDs. The at least one DMRS may also be transmitted in a PDCCH associated with one or more CORESET IDs.

At 810, after the UE 802 receives the configuration for the reference signal set (e.g., at 806) and the reference signal set from the base station 804 (e.g., at 808), the UE 802 may measure RSRP of the one or more reference signals in the reference signal set (e.g., the $\bar{q}_0$ set) for a BFD, where the one or more reference signals may include at least one DMRS, such as described in connection with FIGS. 4 to 7.

In one example, the at least one DMRS, the SSB or the CSI-RS in the reference signal set may belong to one TRP. In another example, the at least one DMRS, the SSB or the CSI-RS in the reference signal set may belong to multiple or different TRPs. The multiple or different TRPs may have a same PCI or different PCIs.

The at least one DMRS may include multiple DMRS ports (e.g., for higher rank PDSCH). In one example, the measurement for the at least one DMRS is based on measuring the RSRP for individual DMRS ports. In another example, the measurement for the at least one DMRS is based on combining measurements obtained from measuring the RSRP for the multiple DMRS ports. In another example, the measurement for the at least one DMRS is based on selecting a highest RSRP measurement among the RSRP for the multiple DMRS ports. In another example, the measurement for the at least one DMRS is based on selecting an average or a median value from measuring the RSRP for the multiple DMRS ports.

At 812, the UE 802 may compare the measurement for the at least one DMRS to a threshold, such as described in connection with FIGS. 4 to 7. In one example, the UE 802 may apply a same threshold (e.g., the threshold $Q_{out,LR}$) for detecting a beam failure based on the at least one DMRS and the SSB or the CSI-RS in the reference signal set for the BFD. In another example, the UE 802 may apply a first threshold for detecting a beam failure based on the at least one DMRS, where the first threshold may be different from a second threshold for detecting the beam failure based on the SSB or the CSI-RS in the reference signal set for the BFD.

At 814, the UE 802 may determine whether to initiate or restart a BFD timer or a BFR procedure based at least in part on the measurement, such as described in connection with FIGS. 4 to 7.

When DMRS is used as reference signal(s) for the BFD, the UE 802 may also determine whether DMRS is being transmit in a transmission occasion. If the DMRS is not being transmitted from the base station 804, the UE 802 may ignore the RSRP measurement for the DMRS in that transmission occasion. For example, the UE 802 may determine whether the at least one DMRS is transmitted in a transmission occasion by measuring the RSRP of that transmission occasion against a second threshold. Then, the UE 802 may refrain from initiating or restarting the BFD timer or the BFR procedure for the transmission occasion when the measured RSRP of that transmission occasion is below the second threshold. In another example, the UE 802 may determine whether the at least one DMRS is transmitted in a PDCCH or a PDSCH in a transmission occasion by verifying whether the PDCCH or the PDSCH passes a CRC in that transmission occasion. Then, the UE 802 may refrain from initiating or restarting the BFD timer or the BFR procedure for the transmission occasion when the PDCCH or the PDSCH fails the CRC.

Figure 9:
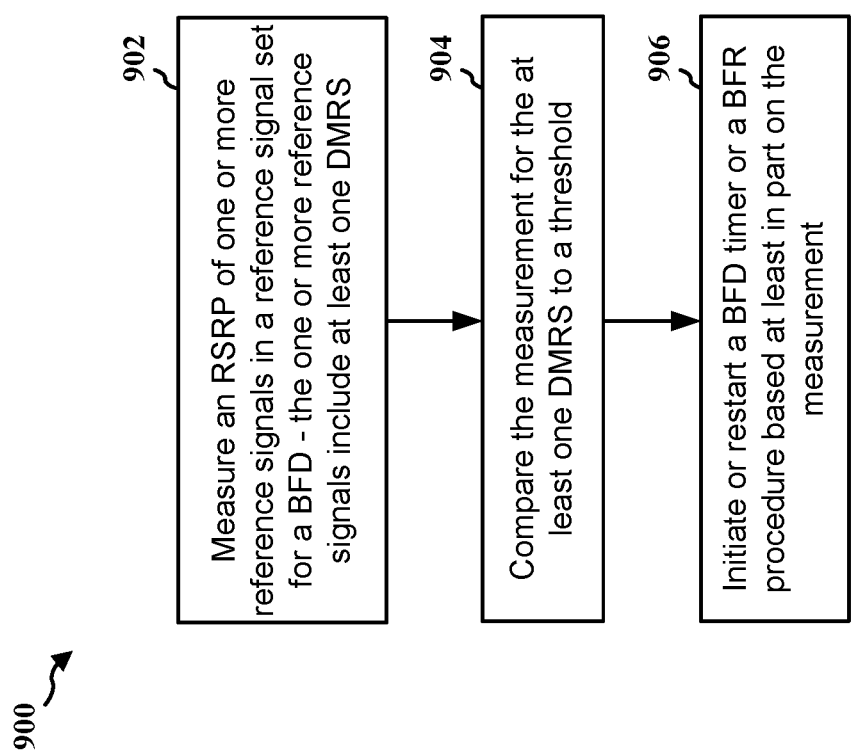
FIG. 9 is a flowchart of a method of wireless communication.

FIG. 9 is a flowchart of a method 900 of wireless communication. The method may be performed by a first UE or a component of a UE (e.g., the UE 104, 350, 402, 602, 702, 802; the apparatus 1002; a processing system, which may include the memory 360 and which may be the entire UE 350 or a component of the UE 350, such as the TX processor 368, the RX processor 356, and/or the controller/processor 359). The method may enable the UE to perform the BFD procedure using DMRS to conserve resources.

At 902, the UE may measure RSRP of one or more reference signals in a reference signal set ($\bar{q}_0$ set) for a BFD, the one or more reference signals may include at least one DMRS, such as described in connection with FIGS. 4 to 8. For example, at 810, the UE 802 may measure RSRP of one or more reference signals in a reference signal set for a BFD, where the one or more reference signals may include at least one DMRS. When the reference signal set includes DMRS, the UE may receive a configuration of the reference signal set for the BFD from a base station, where the configuration of the reference signal set may include the at least one DMRS. The measurement of the RSRP of one or more reference signals in the reference signal set ($\bar{q}_0$ set) for a BFD may be performed by, e.g., the RSRP measurement component 1040 and/or the reception component 1030 of the apparatus 1002 in FIG. 10.

In one example, the reference signal set may further include at least one of an SSB or a CSI-RS. Thus, the UE may receive a configuration of the reference signal set for the BFD from a base station, where the configuration of the reference signal set may include the at least one DMRS or the at least one of the SSB or the CSI-RS. One or more beams associated with the at least one DMRS may be quasi-co-located with the CSI-RS or one or more tracking reference signals. In addition, the at least one of the SSB or the CSI-RS may be configured to be periodic, and the at least one DMRS may be transmitted in a PDSCH associated with one or more SPS configuration IDs and/or transmitted in a PDCCH associated with one or more CORESET IDs.

In one example, the at least one DMRS, the SSB or the CSI-RS in the reference signal set may belong to one TRP. In another example, the at least one DMRS, the SSB or the CSI-RS in the reference signal set may belong to multiple or different TRPs. The multiple or different TRPs may have a same PCI or different PCIs.

The at least one DMRS may include multiple DMRS ports (e.g., for higher rank PDSCH). In one example, the measurement for the at least one DMRS is based on measuring the RSRP for individual DMRS ports. In another example, the measurement for the at least one DMRS is based on combining measurements obtained from measuring the RSRP for the multiple DMRS ports. In another example, the measurement for the at least one DMRS is based on selecting a highest RSRP measurement among the RSRP for the multiple DMRS ports. In another example, the measurement for the at least one DMRS is based on selecting an average or a median value from measuring the RSRP for the multiple DMRS ports.

At 904, the UE may compare the measurement for the at least one DMRS to a threshold, such as described in connection with FIGS. 4 to 8. For example, at 812, the UE 802 compares the measurement for the at least one DMRS to a threshold. The comparison of the measurement may be performed by, e.g., the measurement comparison component 1042 of the apparatus 1002 in FIG. 10.

In one example, the UE may apply a same threshold (e.g., the threshold $Q_{out,LR}$) for detecting a beam failure based on the at least one DMRS and the SSB or the CSI-RS in the reference signal set for the BFD. In another example, the UE may apply a first threshold for detecting a beam failure based on the at least one DMRS, where the first threshold may be different from a second threshold for detecting the beam failure based on the SSB or the CSI-RS in the reference signal set for the BFD.

At 906, the UE may initiate or restart a BFD timer or a BFR procedure based at least in part on the measurement, such as described in connection with FIGS. 4 to 8. For example, at 814, the UE 802 determines whether to initiate or restart a BFD timer or a BFR procedure based at least in part on the measurement. The initiation or restart of the BFD timer or the BFR procedure may be performed by, e.g., the BFD/BFR initiation component 1044 of the apparatus 1002 in FIG. 10.

When DMRS is used as reference signal(s) for the BFD, the UE may also determine whether DMRS is being transmit in a transmission occasion. If the DMRS is not being transmitted from the base station, the UE may ignore the RSRP measurement for the DMRS in that transmission occasion. For example, the UE may determine whether the at least one DMRS is transmitted in a transmission occasion by measuring the RSRP of that transmission occasion against a second threshold. Then, the UE may refrain from initiating or restarting the BFD timer or the BFR procedure for the transmission occasion when the measured RSRP of that transmission occasion is below the second threshold. In other words, the UE may measure the RSRP of a transmission occasion against a second threshold to determine whether the at least one DMRS is transmitted in that transmission occasion, and the UE may refrain from initiating or restarting the BFD timer or the BFR procedure for the transmission occasion when the measured RSRP of that transmission occasion is below the second threshold.

In another example, the 802 UE may determine whether the at least one DMRS is transmitted in a PDCCH or a PDSCH in a transmission occasion by verifying whether the PDCCH or the PDSCH passes a CRC in that transmission occasion. Then, the UE may refrain from initiating or restarting the BFD timer or the BFR procedure for the transmission occasion when the PDCCH or the PDSCH fails the CRC. In other words, the UE may verify whether a physical downlink control channel (PDCCH) or a physical downlink share channel (PDSCH) passes a cyclic redundancy check (CRC) in a transmission occasion to determine whether the at least one DMRS is transmitted in the PDCCH or the PDSCH in that transmission occasion, and the UE may refrain from initiating or restarting the BFD timer or the BFR procedure for the transmission occasion when the PDCCH or the PDSCH fails the CRC.

Figure 10:
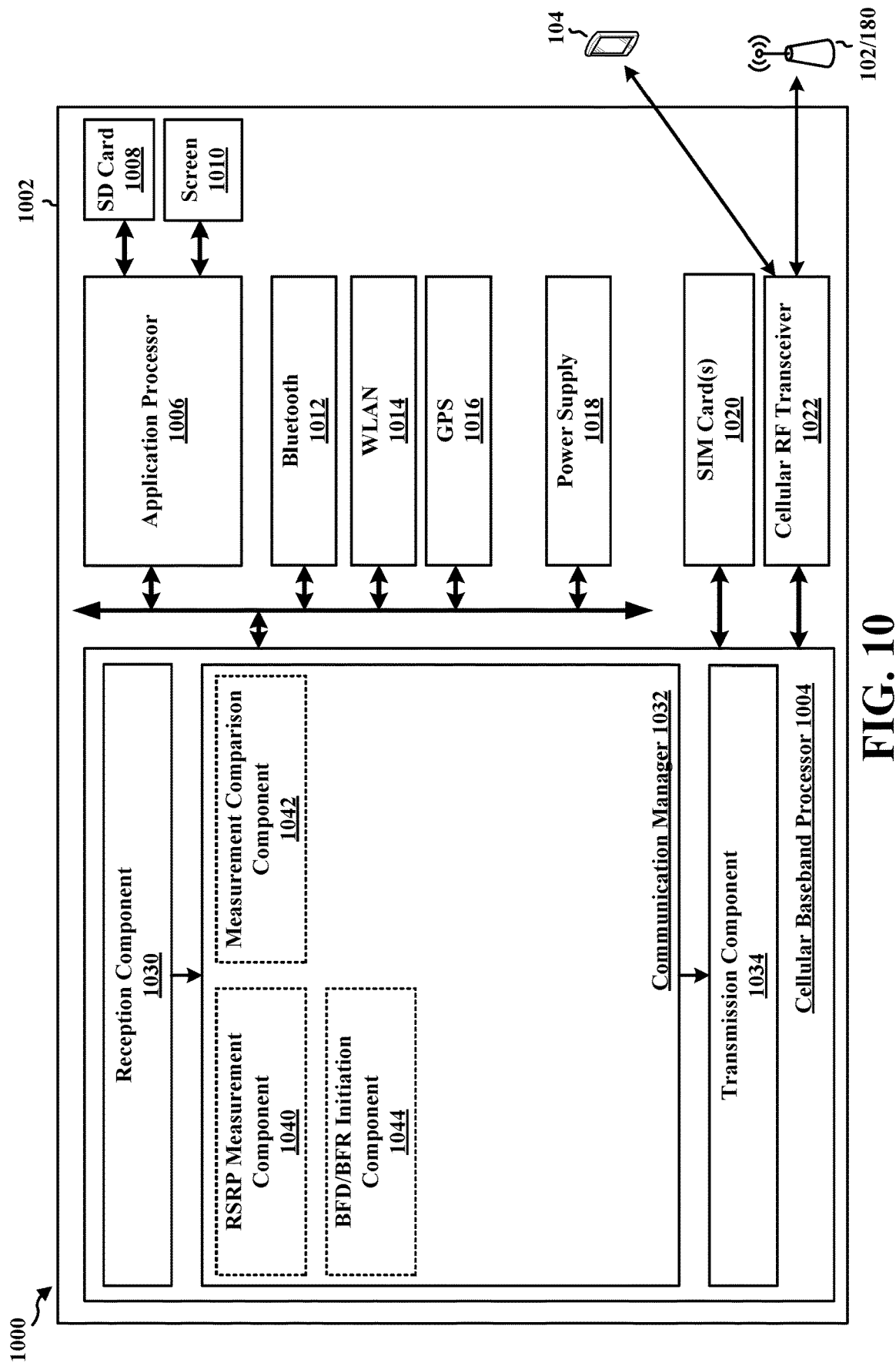
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the additional modules of the apparatus 1002.

The communication manager 1032 includes a RSRP measurement component 1040 that is configured to measure RSRP of one or more reference signals in a reference signal set for a BFD, the one or more reference signals include at least one DMRS, e.g., as described in connection with 902 of FIG. 9. The communication manager 1032 further includes a measurement comparison component 1042 that is configured to compare the measurement for the at least one DMRS to a threshold, e.g., as described in connection with 904 of FIG. 9. The communication manager 1032 further includes a BFD/BFR initiation component 1044 that is configured to initiate or restart a BFD timer or a BFR procedure based at least in part on the measurement, e.g., as described in connection with 906 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for measuring RSRP of one or more reference signals in a reference signal set ($\bar{q}_0$ set) for a BFD, the one or more reference signals include at least one DMRS (e.g., the RSRP measurement component 1040 and/or the reception component 1030). The apparatus 1002 includes means for comparing the measurement for the at least one DMRS to a threshold (e.g., the measurement comparison component 1042). The apparatus 1002 includes means for initiating and/or means for restarting a BFD timer or a BFR procedure based at least in part on the measurement (e.g., the BFD/BFR initiation component 1044). When the reference signal set includes DMRS, the apparatus 1002 includes means for receiving a configuration of the reference signal set for the BFD from a base station, where the configuration of the reference signal set may include the at least one DMRS.

In one configuration, the reference signal set may further include at least one of an SSB or a CSI-RS. In such configuration, the apparatus 1002 includes means for receiving a configuration of the reference signal set for the BFD from a base station, where the configuration of the reference signal set may include the at least one DMRS or the at least one of the SSB or the CSI-RS. In such configuration, one or more beams associated with the at least one DMRS may be quasi-co-located with the CSI-RS or one or more tracking reference signals. In addition, the at least one of the SSB or the CSI-RS may be configured to be periodic, and the at least one DMRS may be transmitted in a PDSCH associated with one or more SPS configuration IDs and/or transmitted in a PDCCH associated with one or more CORESET IDs.

In one configuration, the at least one DMRS, the SSB or the CSI-RS in the reference signal set may belong to one TRP. In another configuration, the at least one DMRS, the SSB or the CSI-RS in the reference signal set may belong to multiple or different TRPs. In such configuration, the multiple or different TRPs may have a same PCI or different PCIs.

In one configuration, the at least one DMRS may include multiple DMRS ports (e.g., for higher rank PDSCH). In such configuration, the measurement for the at least one DMRS may be based on measuring the RSRP for individual DMRS ports. In another configuration, the measurement for the at least one DMRS may be based on combining measurements obtained from measuring the RSRP for the multiple DMRS ports. In another configuration, the measurement for the at least one DMRS may be based on selecting a highest RSRP measurement among the RSRP for the multiple DMRS ports. In another configuration, the measurement for the at least one DMRS may be based on selecting an average or a median value from measuring the RSRP for the multiple DMRS ports.

In one configuration, the apparatus 1002 includes means for applying a same threshold (e.g., the threshold $Q_{out,LR}$) for detecting a beam failure based on the at least one DMRS and the SSB or the CSI-RS in the reference signal set for the BFD. In another configuration, the apparatus 1002 includes means for applying a first threshold for detecting a beam failure based on the at least one DMRS, where the first threshold may be different from a second threshold for detecting the beam failure based on the SSB or the CSI-RS in the reference signal set for the BFD.

When DMRS is used as reference signal(s) for the BFD, the apparatus 1002 may also determine whether DMRS is being transmit in a transmission occasion. If the DMRS is not being transmitted from the base station, the apparatus 1002 may ignore the RSRP measurement for the DMRS in that transmission occasion. In one configuration, the apparatus 1002 includes means for determining whether the at least one DMRS is transmitted in a transmission occasion by measuring the RSRP of that transmission occasion against a second threshold. In such configuration, the apparatus 1002 includes means for refraining from initiating or restarting the BFD timer or the BFR procedure for the transmission occasion when the measured RSRP of that transmission occasion is below the second threshold. In another configuration, the apparatus 1002 includes means for determining whether the at least one DMRS is transmitted in a PDCCH or a PDSCH in a transmission occasion by verifying whether the PDCCH or the PDSCH passes a CRC in that transmission occasion. In such configuration, the apparatus 1002 includes means for refraining from initiating or restarting the BFD timer or the BFR procedure for the transmission occasion when the PDCCH or the PDSCH fails the CRC.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
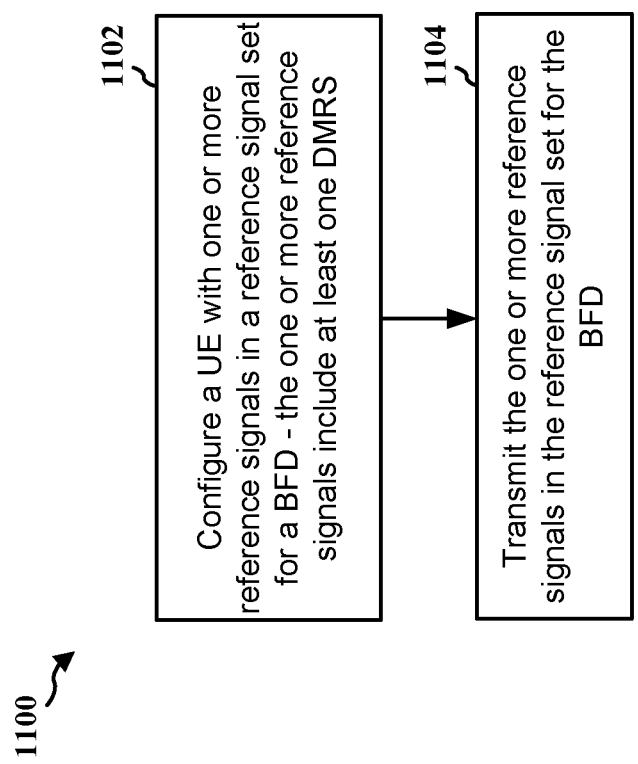
FIG. 11 is a flowchart of a method of wireless communication.

FIG. 11 is a flowchart 1100 of a method of wireless communication. The method may be performed by a base station or a component of a base station (e.g., the base station 102, 180, 310, 404, 604, 704, 804; the apparatus 1202; a processing system, which may include the memory 376 and which may be the entire base station 310 or a component of the base station 310, such as the TX processor 316 the RX processor 370, and/or the controller/processor 375). The method may enable the base station to configure reference signals for a UE for performing BFD, where the reference signals may include DMRS.

At 1102, the base station may configure a UE with one or more reference signals in a reference signal set ($\bar{q}_0$ set) for a BFD, the one or more reference signals may include at least one DMRS, such as described in connection with FIG. 8. For example, at 806, the base station 804 may transmit a configuration for one or more reference signals in a reference signal set for a BFD to the UE 802, where the one or more reference signals may include at least one DMRS. The configuration of the one or more reference signals may be performed by, e.g., the reference signal configuration component 1240 and/or the transmission component 1234 of the apparatus 1202 in FIG. 12.

In one example, the base station may configure a same threshold for the UE to detect a beam failure based on the at least one DMRS and the SSB or the CSI-RS in the reference signal set for the BFD. In another example, the base station may configure a first threshold for the UE to detect a beam failure based on the at least one DMRS, the first threshold being different from a second threshold for the UE to detect the beam failure based on the SSB or the CSI-RS.

In one example, the at least one DMRS may include multiple DMRS ports. Thus, the base station may configure the UE to perform a measurement for the at least one DMRS based on measuring RSRP for individual DMRS ports. Alternatively, or additionally, the base station may configure the UE to perform a measurement for the at least one DMRS based on combining measurements obtained from measuring RSRP for the multiple DMRS ports. Alternatively, or additionally, the base station may configure the UE to perform a measurement for the at least one DMRS based on selecting a highest RSRP measurement among the RSRP for the multiple DMRS ports. Alternatively, or additionally, the base station may configure the UE to perform a measurement for the at least one DMRS based on selecting an average or a median value from measuring RSRP for the multiple DMRS ports.

In one example, the at least one DMRS, the SSB or the CSI-RS in the reference signal set may belong to one TRP. In another example, the at least one DMRS, the SSB or the CSI-RS in the reference signal set may belong to multiple or different TRPs. The multiple or different TRPs may have a same PCI or different PCIs.

At 1104, the base station may transmit the one or more reference signals in the reference signal set for the BFD, such as described in connection with FIG. 8. For example, at 808, the base station 804 may transmit reference signals in the reference signal set to the UE 802 for performing the BFD procedure. The transmission of the reference signals may be performed by, e.g., the reference signal transmission component 1242 and/or the transmission component 1234 of the apparatus 1202 in FIG. 12.

In one example, the reference signal set that is configured for the UE may include at least one of an SSB or a CSI-RS. One or more beams associated with the at least one DMRS may be quasi-co-located with the CSI-RS or one or more tracking reference signals. Also, the at least one of the SSB or the CSI-RS may be configured to be periodic, such that the base station may transmit the at least one DMRS in a PDSCH associated with one or more SPS configuration IDs and/or transmit the at least one DMRS in a PDCCH associated with one or more CORESET IDs.

Figure 12:
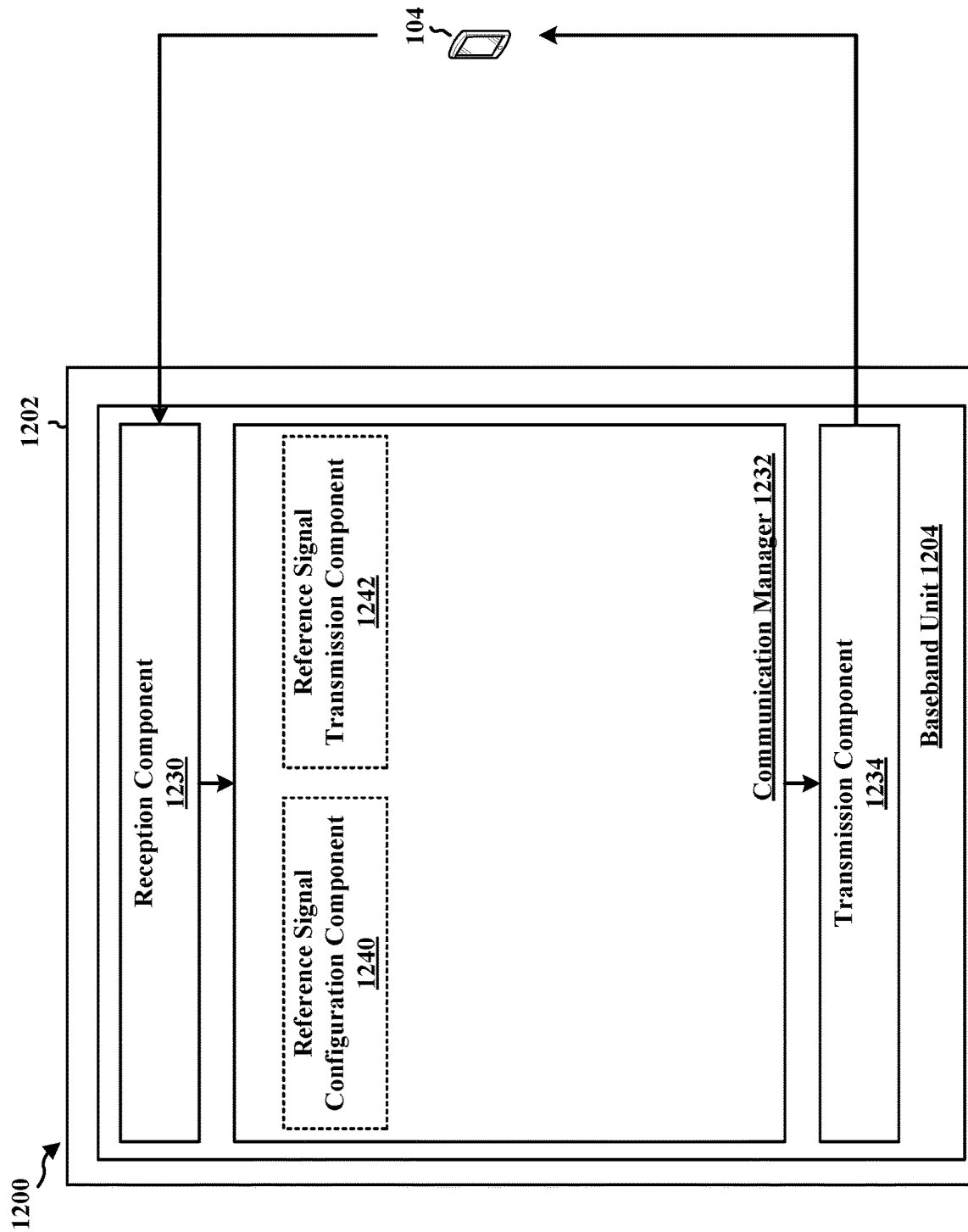
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a reference signal configuration component 1240 that is configured to configure a UE with one or more reference signals in a reference signal set ($\bar{q}_0$ set) for a BFD, the one or more reference signals include at least one DMRS, e.g., as described in connection with 1102 of FIG. 11. The communication manager 1232 further includes a reference signal transmission component 1242 that is configured to transmit the reference signals in the reference signal set for the BFD, e.g., as described in connection with 1104 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for configuring a UE with one or more reference signals in a reference signal set ($\bar{q}_0$ set) for a BFD, the one or more reference signals include at least one DMRS (e.g., the reference signal configuration component 1240 and/or the transmission component 1234). The apparatus 1202 includes means for transmitting the references signals in the reference signal set for the BFD (e.g., the reference signal transmission component 1242 and/or the transmission component 1234).

In one configuration, the apparatus 1202 includes means for configuring a same threshold for the UE to detect a beam failure based on the at least one DMRS and the SSB or the CSI-RS in the reference signal set for the BFD. In another configuration, the apparatus 1202 includes means for configuring a first threshold for the UE to detect a beam failure based on the at least one DMRS, the first threshold is different from a second threshold for the UE to detect the beam failure based on the SSB or the CSI-RS.

In one configuration, the at least one DMRS may include multiple DMRS ports. Thus, the apparatus 1202 includes means for configuring the UE to perform a measurement for the at least one DMRS based on measuring RSRP for individual DMRS ports. Alternatively, or additionally, the apparatus 1202 includes means for configuring the UE to perform a measurement for the at least one DMRS based on combining measurements obtained from measuring RSRP for the multiple DMRS ports. Alternatively, or additionally, the apparatus 1202 includes means for configuring the UE to perform a measurement for the at least one DMRS based on selecting a highest RSRP measurement among the RSRP for the multiple DMRS ports. Alternatively, or additionally, the apparatus 1202 includes means for configuring the UE to perform a measurement for the at least one DMRS based on selecting an average or a median value from measuring RSRP for the multiple DMRS ports.

In one configuration, the at least one DMRS, the SSB or the CSI-RS in the reference signal set may belong to one TRP. In another configuration, the at least one DMRS, the SSB or the CSI-RS in the reference signal set may belong to multiple or different TRPs. The multiple or different TRPs may have a same PCI or different PCIs.

In one configuration, the reference signal set that is configured for the UE may include at least one of an SSB or a CSI-RS. One or more beams associated with the at least one DMRS may be quasi-co-located with the CSI-RS or one or more tracking reference signals. Also, the at least one of the SSB or the CSI-RS may be configured to be periodic, such that the apparatus 1202 includes means for transmitting the at least one DMRS in a PDSCH associated with one or more SPS configuration IDs and/or transmitting the at least one DMRS in a PDCCH associated with one or more CORESET IDs.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects presented herein may improve the performance and/or efficiency of a BFD procedure for a UE, where the UE may use DMRS in place of CSI-RS and/or SSB to perform the BFD to reduce the occasion(s) of configuring multiple or frequent CSI-RS resources sets for the UE. This may also provide more beam options for the BFD procedures.

The following examples set forth additional aspects and are illustrative only and aspects thereof may be combined with aspects of other embodiments or teaching described herein, without limitation.

Aspect 1 is a method of wireless communication of a UE, including: measuring RSRP of one or more reference signals in a reference signal set ($\bar{q}_0$ set) for a BFD, the one or more reference signals include at least one DMRS; comparing the measurement for the at least one DMRS to a threshold; and determining whether to initiate or restart a BFD timer or a BFR procedure based at least in part on the measurement.

In aspect 2, the method of aspect 1 further includes: receiving a configuration of the reference signal set for the BFD from a base station, the configuration of the reference signal set including the at least one DMRS.

In aspect 3, the method of aspect 1 or aspect 2 further includes that the reference signal set further includes at least one of an SSB or a CSI-RS.

In aspect 4, the method of any of aspects 1-3 further includes: receiving a configuration of the reference signal set for the BFD from a base station, the configuration of the reference signal set including the at least one DMRS or the at least one of the SSB or the CSI-RS.

In aspect 5, the method of any of aspects 1-4 further includes that one or more beams associated with the at least one DMRS are quasi-co-located with the CSI-RS or one or more tracking reference signals.

In aspect 6, the method of any of aspects 1-5 further includes that the at least one of the SSB or the CSI-RS is configured to be periodic.

In aspect 7, the method of any of aspects 1-6 further includes that the at least one DMRS is transmitted in a PDSCH associated with one or more SPS configuration IDs.

In aspect 8, the method of any of aspects 1-7 further includes that the at least one DMRS is transmitted in a PDCCH associated with one or more CORESET IDs.

In aspect 9, the method of any of aspects 1-8 further includes that the UE applies a same threshold for detecting a beam failure based on the at least one DMRS and the SSB or the CSI-RS in the reference signal set for the BFD.

In aspect 10, the method of any of aspects 1-9 further includes that the UE applies a first threshold for detecting a beam failure based on the at least one DMRS, the first threshold being different from a second threshold for detecting the beam failure based on the SSB or the CSI-RS in the reference signal set for the BFD.

In aspect 11, the method of any of aspects 1-10 further includes that the at least one DMRS includes multiple DMRS ports.

In aspect 12, the method of any of aspects 1-11 further includes that the measurement for the at least one DMRS is based on measuring the RSRP for individual DMRS ports.

In aspect 13, the method of any of aspects 1-12 further includes that the measurement for the at least one DMRS is based on combining measurements obtained from measuring the RSRP for the multiple DMRS ports.

In aspect 14, the method of any of aspects 1-13 further includes that the measurement for the at least one DMRS is based on selecting a highest RSRP measurement among the RSRP for the multiple DMRS ports.

In aspect 15, the method of any of aspects 1-14 further includes that the measurement for the at least one DMRS is based on selecting an average or a median value from measuring the RSRP for the multiple DMRS ports.

In aspect 16, the method of any of aspects 1-15 further includes that the at least one DMRS, the SSB or the CSI-RS in the reference signal set belong to one TRP.

In aspect 17, the method of any of aspects 1-16 further includes that the at least one DMRS, the SSB or the CSI-RS in the reference signal set belong to multiple TRPs.

In aspect 18, the method of any of aspects 1-17 further includes that the multiple TRPs have a same PCI.

In aspect 19, the method of any of aspects 1-18 further includes that the multiple TRPs have a different PCIs.

In aspect 20, the method of any of aspects 1-19 further includes: determining whether the at least one DMRS is transmitted in a transmission occasion by measuring the RSRP of that transmission occasion against a second threshold; and refraining from initiating or restarting the BFD timer or the BFR for the transmission occasion when the measured RSRP of that transmission occasion is below the second threshold.

In aspect 21, the method of any of aspects 1-20 further includes: determining whether the at least one DMRS is transmitted in a PDCCH or a PDSCH in a transmission occasion by verifying whether the PDCCH or the PDSCH passes a CRC in that transmission occasion; and refraining from initiating or restarting the BFD timer or the BFR procedure for the transmission occasion when the PDCCH or the PDSCH fails the CRC.

Aspect 22 is an apparatus for wireless communication of a UE, including: means for measuring RSRP of one or more reference signals in a reference signal set ($\bar{q}_0$ set) for a BFD, the one or more reference signals include at least one DMRS; means for comparing the measurement for the at least one DMRS to a threshold; and means for determining whether to initiate or restart a BFD timer or a BFR procedure based at least in part on the measurement.

In aspect 23, the apparatus of aspect 22 further includes means to perform the method of any of aspects 2-21.

Aspect 24 is an apparatus for wireless communication of a UE, including: a memory; and at least one processor coupled to the memory, the memory and the at least one processor configured to perform the method of aspects 1-21.

Aspect 25 is a non-transitory computer-readable medium storing computer executable code for wireless communication of a UE, the code when executed by a processor cause the processor to perform the method of any of aspects 1-21.

Aspect 26 is a method of wireless communication of a base station, including: configuring a UE with one or more reference signals in a reference signal set ($\bar{q}_0$ set) for a BFD, the one or more reference signals include at least one DMRS; and transmitting the reference signals in the reference signal set for the BFD.

In aspect 27, the method of aspect 26 further includes that the reference signal set that is configured for the UE further includes at least one of an SSB or a CSI-RS.

In aspect 28, the method of aspect 26 or aspect 27 further includes that one or more beams associated with the at least one DMRS are quasi-co-located with the CSI-RS or one or more tracking reference signals.

In aspect 29, the method of any of aspects 26-28 further includes that the at least one of the SSB or the CSI-RS is configured to be periodic.

In aspect 30, the method of any of aspects 26-29 further includes that the base station transmits the at least one DMRS in a PDSCH associated with one or more SPS configuration IDs.

In aspect 31, the method of any of aspects 26-30 further includes that the base station transmits the at least one DMRS in a PDCCH associated with one or more CORESET IDs.

In aspect 32, the method of any of aspects 26-31 further includes that the base station configures a same threshold for the UE to detect a beam failure based on the at least one DMRS and the SSB or the CSI-RS in the reference signal set for the BFD.

In aspect 33, the method of any of aspects 26-32 further includes that the base station configures a first threshold for the UE to detect a beam failure based on the at least one DMRS, the first threshold being different from a second threshold for the UE to detect the beam failure based on the SSB or the CSI-RS.

In aspect 34, the method of any of aspects 26-33 further includes that the at least one DMRS includes multiple DMRS ports.

In aspect 35, the method of any of aspects 26-34 further includes that the base station configures the UE to perform a measurement for the at least one DMRS is based on measuring RSRP for individual DMRS ports.

In aspect 36, the method of any of aspects 26-35 further includes that the base station configures the UE to perform a measurement for the at least one DMRS is based on combining measurements obtained from measuring RSRP for the multiple DMRS ports.

In aspect 37, the method of any of aspects 26-36 further includes that the base station configures the UE to perform a measurement for the at least one DMRS is based on selecting a highest RSRP measurement among the RSRP for the multiple DMRS ports.

In aspect 38, the method of any of aspects 26-37 further includes that the base station configures the UE to perform a measurement for the at least one DMRS is based on selecting an average or a median value from measuring RSRP for the multiple DMRS ports.

In aspect 39, the method of any of aspects 26-38 further includes that the at least one DMRS, the SSB or the CSI-RS in the reference signal set belong to one TRP.

In aspect 40, the method of any of aspects 26-39 further includes that the at least one DMRS, the SSB or the CSI-RS in the reference signal set belong to multiple TRPs.

In aspect 41, the method of any of aspects 26-40 further includes that the multiple TRPs have a same PCI.

In aspect 42, the method of any of aspects 26-41 further includes that the multiple TRPs have a different PCIs.

Aspect 43 is an apparatus for wireless communication of a base station, including: means for configuring a UE with one or more reference signals in a reference signal set ($\bar{q}_0$ set) for a BFD, the one or more reference signals include at least one DMRS; and means for transmitting the reference signals in the reference signal set for the BFD.

In aspect 44, the apparatus of aspect 43 further includes means to perform the method of any of aspects 27-42.

Aspect 45 is an apparatus for wireless communication of a base station, including: a memory; and at least one processor coupled to the memory, the memory and the at least one processor configured to perform the method of aspects 26-42.

Aspect 46 is a non-transitory computer-readable medium storing computer executable code for wireless communication at a base station, the code when executed by a processor cause the processor to perform the method of any of aspects 26-42.

Aspect 47 is an apparatus for wireless communication including at least one processor coupled to a memory and configured to measure an RSRP of one or more reference signals in a reference signal set ($\bar{q}_0$ set) for a BFD, the one or more reference signals include at least one DMRS; compare a measurement for the at least one DMRS to a threshold; and initiate or restart a BFD timer or a BFR procedure based at least in part on the measurement.

Aspect 48 is the apparatus of aspect 47, where the at least one processor and the memory are further configured to: receive a configuration of the reference signal set for the BFD from a base station, the configuration of the reference signal set including the at least one DMRS.

Aspect 49 is the apparatus of any of aspects 47 and 48, where the reference signal set further comprises at least one of an SSB or a CSI-RS.

Aspect 50 is the apparatus of any of aspects 47 to 49, where the at least one processor and the memory are further configured to: receive a configuration of the reference signal set for the BFD from a base station, the configuration of the reference signal set including the at least one DMRS or the at least one of the SSB or the CSI-RS.

Aspect 51 is the apparatus of any of aspects 47 to 50, where one or more beams associated with the at least one DMRS are QCLed with the CSI-RS or one or more TRSs.

Aspect 52 is the apparatus of any of aspects 47 to 51, where the at least one of the SSB or the CSI-RS is configured to be periodic.

Aspect 53 is the apparatus of any of aspects 47 to 52, where the at least one DMRS is transmitted in a PDSCH associated with one or more SPS configuration IDs.

Aspect 54 is the apparatus of any of aspects 47 to 53, where the at least one DMRS is transmitted in a PDCCH associated with one or more CORESET IDs.

Aspect 55 is the apparatus of any of aspects 47 to 54, where the at least one processor and the memory are further configured to: apply a same threshold for detecting a beam failure based on the at least one DMRS and the SSB or the CSI-RS in the reference signal set for the BFD.

Aspect 56 is the apparatus of any of aspects 47 to 55, where the at least one processor and the memory are further configured to: apply a first threshold for detecting a beam failure based on the at least one DMRS, the first threshold being different from a second threshold for detecting the beam failure based on the SSB or the CSI-RS in the reference signal set for the BFD.

Aspect 57 is the apparatus of any of aspects 47 to 56, where the at least one DMRS, the SSB or the CSI-RS in the reference signal set belong to one TRP.

Aspect 58 is the apparatus of any of aspects 47 to 57, where the at least one DMRS, the SSB or the CSI-RS in the reference signal set belong to multiple TRPs.

Aspect 59 is the apparatus of any of aspects 47 to 58, where the multiple TRPs have a same PCI, or different physical cell IDs.

Aspect 60 is the apparatus of any of aspects 47 to 59, where the at least one DMRS includes multiple DMRS ports.

Aspect 61 is the apparatus of any of aspects 47 to 60, where the measurement for the at least one DMRS is based on one or more of measuring the RSRP for individual DMRS ports, combining measurements obtained from measuring the RSRP for the multiple DMRS ports, selecting a highest RSRP measurement among the RSRP for the multiple DMRS ports, or selecting an average or a median value from measuring the RSRP for the multiple DMRS ports.

Aspect 62 is the apparatus of any of aspects 47 to 61, where the at least one processor and the memory are further configured to: measure the RSRP of a transmission occasion against a second threshold to determine whether the at least one DMRS is transmitted in that transmission occasion; and refrain from initiating or restarting the BFD timer or the BFR procedure for the transmission occasion when the measured RSRP of that transmission occasion is below the second threshold.

Aspect 63 is the apparatus of any of aspects 47 to 62, where the at least one processor and the memory are further configured to: verify whether a PDCCH or a PDSCH passes a CRC in a transmission occasion to determine whether the at least one DMRS is transmitted in the PDCCH or the PDSCH in that transmission occasion; and refrain from initiating or restarting the BFD timer or the BFR procedure for the transmission occasion when the PDCCH or the PDSCH fails the CRC.

Aspect 64 is the apparatus of any of aspects 47 to 63, further comprising a transceiver coupled to the at least one processor.

Aspect 65 is a method of wireless communication for implementing any of aspects 47 to 64.

Aspect 66 is an apparatus for wireless communication including means for implementing any of aspects 47 to 64.

Aspect 67 is a computer-readable medium storing computer executable code, where the code when executed by a processor causes the processor to implement any of aspects 47 to 64.

Aspect 68 is an apparatus for wireless communication including at least one processor coupled to a memory and configured to: configure a UE with one or more reference signals in a reference signal set ($\bar{q}_0$ set) for a BFD, the one or more reference signals include at least one DMRS; and transmit the reference signals in the reference signal set for the BFD.

Aspect 69 is the apparatus of aspect 68, where the reference signal set that is configured for the UE further comprises at least one of an SSB or a CSI-RS.

Aspect 70 is the apparatus of any of aspects 68 and 69, where one or more beams associated with the at least one DMRS are QCLed with the CSI-RS or one or more TRSs.

Aspect 71 is the apparatus of any of aspects 68 to 70, where the at least one of the SSB or the CSI-RS is configured to be periodic.

Aspect 72 is the apparatus of any of aspects 68 to 71, where the at least one processor and the memory are further configured to: transmit the at least one DMRS in a PDSCH associated with one or more SPS configuration IDs, or in a PDCCH associated with one or more CORESET IDs.

Aspect 73 is the apparatus of any of aspects 68 to 72, where the at least one processor and the memory are further configured to: configure a same threshold for the UE to detect a beam failure based on the at least one DMRS and the SSB or the CSI-RS in the reference signal set for the BFD.

Aspect 74 is the apparatus of any of aspects 68 to 73, where the at least one processor and the memory are further configured to: configure a first threshold for the UE to detect a beam failure based on the at least one DMRS, the first threshold being different from a second threshold for the UE to detect the beam failure based on the SSB or the CSI-RS.

Aspect 75 is the apparatus of any of aspects 68 to 74, where the at least one DMRS includes multiple DMRS ports.

Aspect 76 is the apparatus of any of aspects 68 to 75, where the at least one processor and the memory configure the UE to perform a measurement for the at least one DMRS is based on one or more of measuring RSRP for individual DMRS ports, combining measurements obtained from measuring RSRP for the multiple DMRS ports, selecting a highest RSRP measurement among the RSRP for the multiple DMRS ports, or selecting an average or a median value from measuring RSRP for the multiple DMRS ports.

Aspect 77 is the apparatus of any of aspects 68 to 76, where the at least one DMRS, the SSB or the CSI-RS in the reference signal set belong to one TRP, or belong to multiple TRPs that have a same PCI or different PCIs.

Aspect 78 is a method of wireless communication for implementing any of aspects 68 to 77.

Aspect 79 is an apparatus for wireless communication including means for implementing any of aspects 68 to 77.

Aspect 80 is a computer-readable medium storing computer executable code, where the code when executed by a processor causes the processor to implement any of aspects 68 to 77.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are to be encompassed by the claims. Moreover, nothing disclosed herein is to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   memory; and
   at least one processor coupled to the memory and configured to cause the UE to:
      measure reference signal received power (RSRP) for at least one demodulation reference signal (DMRS) and at least one non-DMRS in a reference signal set ($\bar{q}_0$ set) for a beam failure detection (BFD);
      compare the measured RSRP for the at least one DMRS to a first RSRP threshold and the measured RSRP for the at least one non-DMRS to a second RSRP threshold, the first RSRP threshold being different from the second RSRP threshold; and
      initiate or restart a BFD timer or a beam failure recovery (BFR) procedure based on the measured RSRP for the at least one DMRS being below the first RSRP threshold and the measured RSRP for the at least one non-DMRS being below the second RSRP threshold.

2. The apparatus of claim 1, wherein the at least one processor and the memory are further configured to cause the UE to:
   receive a configuration of the reference signal set for the BFD from a base station, the configuration of the reference signal set including the at least one DMRS.

3. The apparatus of claim 1, wherein the at least one non-DMRS includes at least one of a synchronization signal block (SSB) or a channel state information reference signal (CSI-RS).

4. The apparatus of claim 3, wherein the at least one processor and the memory are further configured to cause the UE to:
   receive a configuration of the reference signal set for the BFD from a base station, the configuration of the reference signal set including the at least one DMRS and the at least one of the SSB or the CSI-RS.

5. The apparatus of claim 4, wherein one or more beams associated with the at least one DMRS are quasi-co-located (QCLed) with the CSI-RS or one or more tracking reference signals (TRSs).

6. The apparatus of claim 3, wherein the at least one of the SSB or the CSI-RS is configured to be periodic.

7. The apparatus of claim 6, wherein the at least one DMRS is transmitted in a physical downlink share channel (PDSCH) associated with one or more semi-persistent scheduling (SPS) configuration identifications (IDs).

8. The apparatus of claim 6, wherein the at least one DMRS is transmitted in a physical downlink control channel (PDCCH) associated with one or more control resource set (CORESET) identifications (IDs).

9. The apparatus of claim 3, wherein the at least one DMRS, the SSB or the CSI-RS in the reference signal set belong to one transmission and reception point (TRP).

10. The apparatus of claim 3, wherein the at least one DMRS, the SSB or the CSI-RS in the reference signal set belong to multiple transmission and reception points (TRPs).

11. The apparatus of claim 10, wherein the multiple TRPs have a same physical cell ID (PCI), or different physical cell identifications (IDs).

12. The apparatus of claim 1, wherein the at least one DMRS includes multiple DMRS ports.

13. The apparatus of claim 12, wherein to measure the RSRP for the at least one DMRS, the at least one processor is configured to cause the UE to:
   measure the RSRP for each individual DMRS ports of the multiple DMRS ports; and select a highest RSRP measurement from the multiple DMRS ports, or obtain an average or a median RSRP measurement from the multiple DMRS ports.

14. The apparatus of claim 1, wherein the at least one processor and the memory are further configured to cause the UE to:
measure the RSRP of a transmission occasion against a third RSRP threshold to determine whether the at least one DMRS is transmitted in that transmission occasion; and
refrain from initiating or restarting the BFD timer or the BFR procedure for the transmission occasion when the measured RSRP of that transmission occasion is below the third RSRP threshold.

15. The apparatus of claim 1, wherein the at least one processor and the memory are further configured to cause the UE to:
verify whether a physical downlink control channel (PDCCH) or a physical downlink share channel (PDSCH) passes a cyclic redundancy check (CRC) in a transmission occasion to determine whether the at least one DMRS is transmitted in the PDCCH or the PDSCH in that transmission occasion; and
refrain from initiating or restarting the BFD timer or the BFR procedure for the transmission occasion when the PDCCH or the PDSCH fails the CRC.

16. The apparatus of claim 1, further comprising a transceiver coupled to the at least one processor.

17. A method of wireless communication of a user equipment (UE), comprising:
measuring reference signal received power (RSRP) for at least one demodulation reference signal (DMRS) and at least one non-DMRS in a reference signal set ($\bar{q}_0$ set) for a beam failure detection (BFD);
comparing the measured RSRP for the at least one DMRS to a first RSRP threshold and the measured RSRP for the at least one non-DMRS to a second RSRP threshold, the first RSRP threshold being different from the second RSRP threshold; and
initiate or restart a BFD timer or a beam failure recovery (BFR) procedure based on the measured RSRP for the at least one DMRS being below the first RSRP threshold and the measured RSRP for the at least one non-DMRS being below the second RSRP threshold.

18. The method of claim 17, further comprising:
receiving a configuration of the reference signal set for the BFD from a base station, the configuration of the reference signal set including the at least one DMRS.

19. The method of claim 17, wherein the at least one non-DMRS includes at least one of a synchronization signal block (SSB) or a channel state information reference signal (CSI-RS).

20. The method of claim 19, further comprising:
receiving a configuration of the reference signal set for the BFD from a base station, the configuration of the reference signal set including the at least one DMRS and the at least one of the SSB or the CSI-RS.

21. The method of claim 20, wherein one or more beams associated with the at least one DMRS are quasi-co-located (QCLed) with the CSI-RS or one or more tracking reference signals (TRSs).

22. The method of claim 19, wherein the at least one DMRS, the SSB or the CSI-RS in the reference signal set belong to one transmission and reception point (TRP).

23. The method of claim 19, wherein the at least one DMRS, the SSB or the CSI-RS in the reference signal set belong to multiple transmission and reception points (TRPs).

24. The method of claim 17, wherein the at least one DMRS includes multiple DMRS ports, and wherein measuring the RSRP for the at least one DMRS comprises:
measuring the RSRP for each individual DMRS ports of the multiple DMRS ports; and
selecting a highest RSRP measurement from the multiple DMRS ports, or obtaining an average or a median RSRP measurement from the multiple DMRS ports.

25. The method of claim 17, further comprising:
measuring the RSRP of a transmission occasion against a third RSRP threshold to determine whether the at least one DMRS is transmitted in that transmission occasion; and
refraining from initiating or restarting the BFD timer or the BFR procedure for the transmission occasion when the measured RSRP of that transmission occasion is below the third RSRP threshold.

26. The method of claim 17, further comprising:
verifying whether a physical downlink control channel (PDCCH) or a physical downlink share channel (PDSCH) passes a cyclic redundancy check (CRC) in a transmission occasion to determine whether the at least one DMRS is transmitted in the PDCCH or the PDSCH in that transmission occasion; and
refraining from initiating or restarting the BFD timer or the BFR procedure for the transmission occasion when the PDCCH or the PDSCH fails the CRC.

27. An apparatus for wireless communication at a user equipment (UE), comprising:
means for measuring reference signal received power (RSRP) for at least one demodulation reference signal (DMRS) and at least one non-DMRS in a reference signal set ($\bar{q}_0$ set) for a beam failure detection (BFD);
means for comparing the measured RSRP for the at least one DMRS to a first threshold and the measured RSRP for the at least one non-DMRS to a second RSRP threshold, the first RSRP threshold being different from the second RSRP threshold; and
means for initiating or restarting a BFD timer or a beam failure recovery (BFR) procedure based on the measured RSRP for the at least one DMRS being below the first RSRP threshold and the measured RSRP for the at least one non-DMRS being below the second RSRP threshold.

28. A non-transitory computer-readable medium storing computer executable code at a user equipment (UE), the code when executed by at least one processor causes the UE to:
measure a reference signal received power (RSRP) for at least one demodulation reference signal (DMRS) and at least one non-DMRS in a reference signal set ($\bar{q}_0$ set) for a beam failure detection (BFD);
compare the measured RSRP for the at least one DMRS to a first RSRP threshold and the measured RSRP for the at least one non-DMRS to a second RSRP threshold, the first RSRP threshold being different from the second RSRP threshold; and initiate or restart a BFD timer or a beam failure recovery (BFR) procedure based on the measured RSRP for the at least one DMRS being below the first RSRP threshold and the measured RSRP for the at least one non-DMRS being below the second RSRP threshold.

* * * * *